United States Patent [19]
Kamatani

[11] Patent Number: 5,187,581
[45] Date of Patent: Feb. 16, 1993

[54] SOLID STATE IMAGE SENSING DEVICE INCLUDING NONLINEAR CONVERSION PROCESSING OF INPUT LIGHT LEVELS

[75] Inventor: Yukio Kamatani, Yokohama, Japan

[73] Assignee: Kabushiki Kaisha Toshiba, Kawasaki, Japan

[21] Appl. No.: 757,047

[22] Filed: Sep. 9, 1991

[30] Foreign Application Priority Data

Sep. 11, 1990 [JP] Japan ................................. 2-238885
Mar. 4, 1991 [JP] Japan ................................. 3-37482

[51] Int. Cl.$^5$ .......................................... H04N 5/335
[52] U.S. Cl. ........................... 358/213.11; 358/213.19; 358/213.23
[58] Field of Search ............... 358/212, 213.11, 213.13, 358/213.19, 213.27, 213.26, 213.28, 213.31, 228, 213.23; 250/205, 206, 208.1; 357/24 LR

[56] References Cited

U.S. PATENT DOCUMENTS 4,914,519 4/1990 Hashimoto et al. ............. 358/213.18
5,038,214 8/1991 Miida .............................. 358/213.11
5,062,000 10/1991 Harris et al. ..................... 358/213.27

OTHER PUBLICATIONS

"Photoreceptor Circuit", Analog VLSI and Neural Systems, C. Mead, 1989, pp. 260-261.
"An Analog CMOS Network for Gaussian Convolution with Embedded Image Sensing", IEEE Intern'l Solid-State Circuits Conference, Digest of Technical Papers, H. Kobayashi et al., Feb. 16, 1990, pp. 216,217, & 300.
"An Object Position and Orientation IC with Embedded Imager", IEEE Intern'l Solid-State Circuits Conference, Digest of Technical Papers, David L. Standley et al., Feb. 13, 1991, pp. 38-39.
"Computing Motion Using Analog and Binary Resistive Networks", IEEE, Mar. 1988, James Hutchinson et al., pp. 52-63.
"An Active Resistor Network for Gaussian Filtering of Images", IEEE Journal of Solid-State Circuits, vol. 26, No. 5, May 1991, Haruo Kobayashi et al., pp. 738-748.
"The Thevenin-Norton Theorem", General Resistive Circuits/Linear and Nonlinear Circuits, pp. 251-259.
"A Silicon Model of Early Visual Processing", Neural Networks, vol. 1, 1988, Carver Mead et al., pp. 91-97.
"Parallel Analog Circuits for Real Time Signal Processing: Design and Analysis", ISCAS '89, J. L. White et al., pp. 70-73.
"Resistive Networks", Appendix C, pp. 339-351.

Primary Examiner—Michael T. Razavi
Assistant Examiner—Tuan V. Ho
Attorney, Agent, or Firm—Oblon, Spivak, McClelland, Maier & Neustadt

[57] ABSTRACT

A solid state image sensing device of this invention includes signal charge storage units, arranged in a matrix form on a semiconductor substrate, for storing a signal charge generated by photoelectric conversion, signal charge reading units for reading out the signal charge from the signal charge storage units, a pixel signal processing unit, provided in each of a plurality of blocks obtained by dividing the matrix arrangement of the signal charge storage units, for detecting a luminance to output a control signal corresponding to the luminance, a signal charge extracting unit provided adjacent to each of the signal charge storage units and controlled by the control signal obtained in a corresponding block to extract an excessive signal charge from the signal charge storage unit of the block, and coupling elements for connecting adjacent pixel signal processing units.

15 Claims, 24 Drawing Sheets

- : INPUT
- ○ : OUTPUT

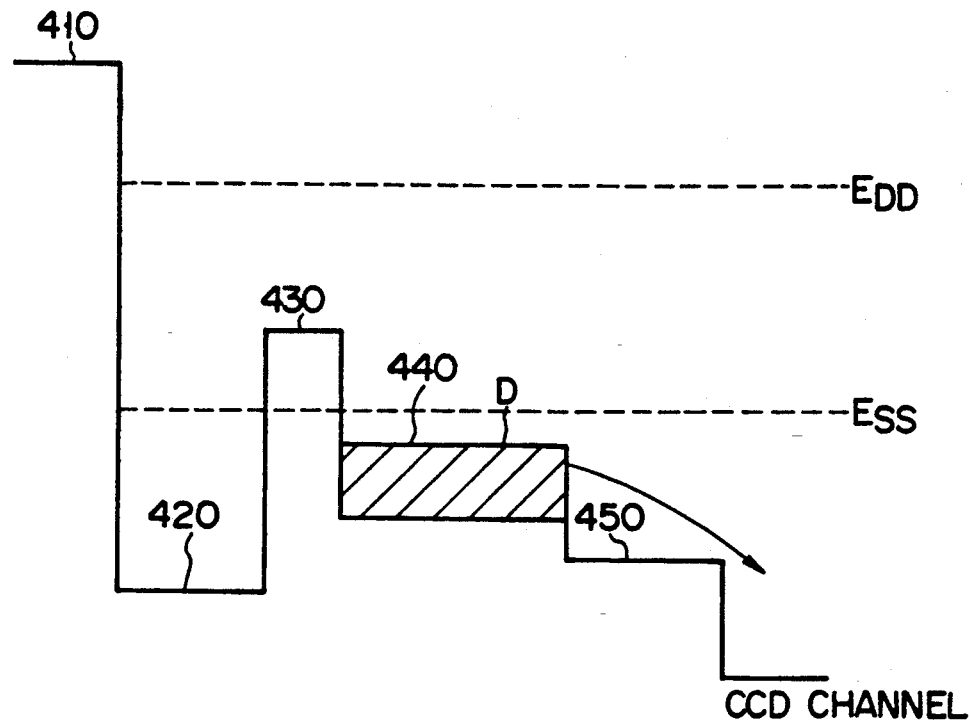
F I G. 12
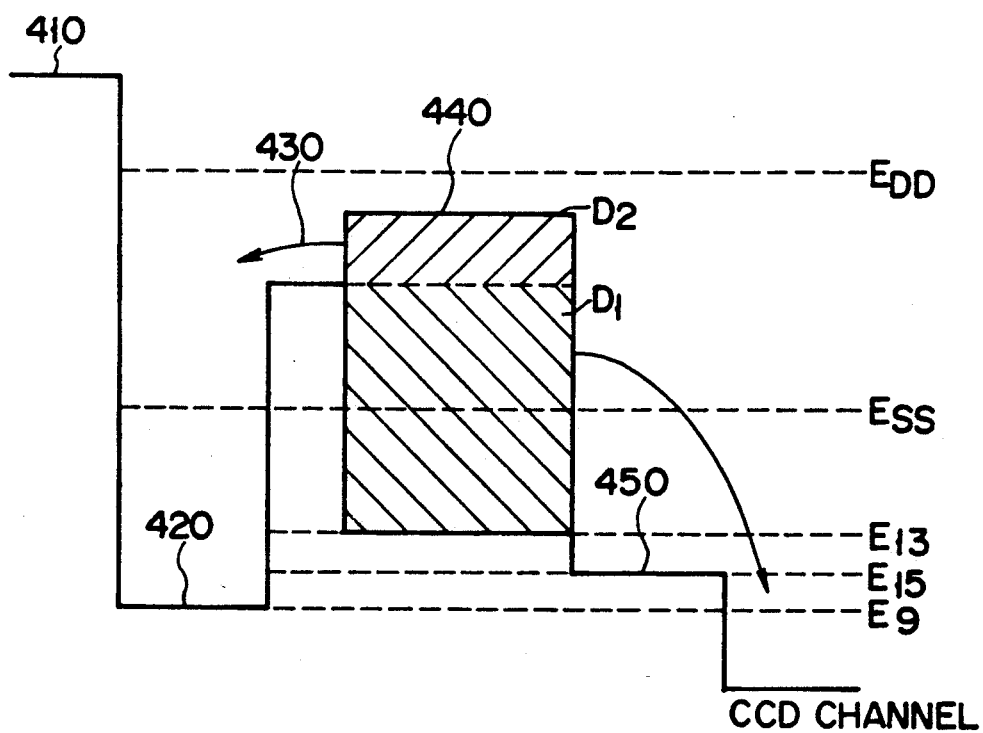
F I G. 13

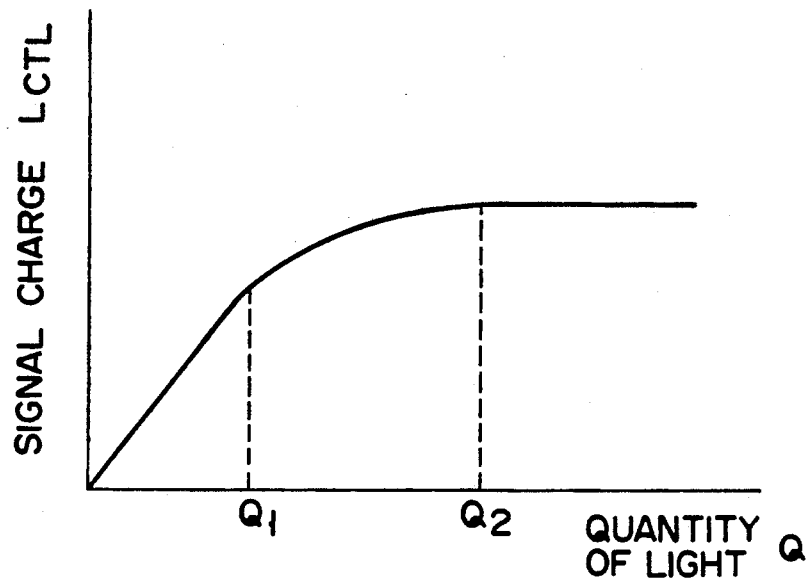
F I G. 14
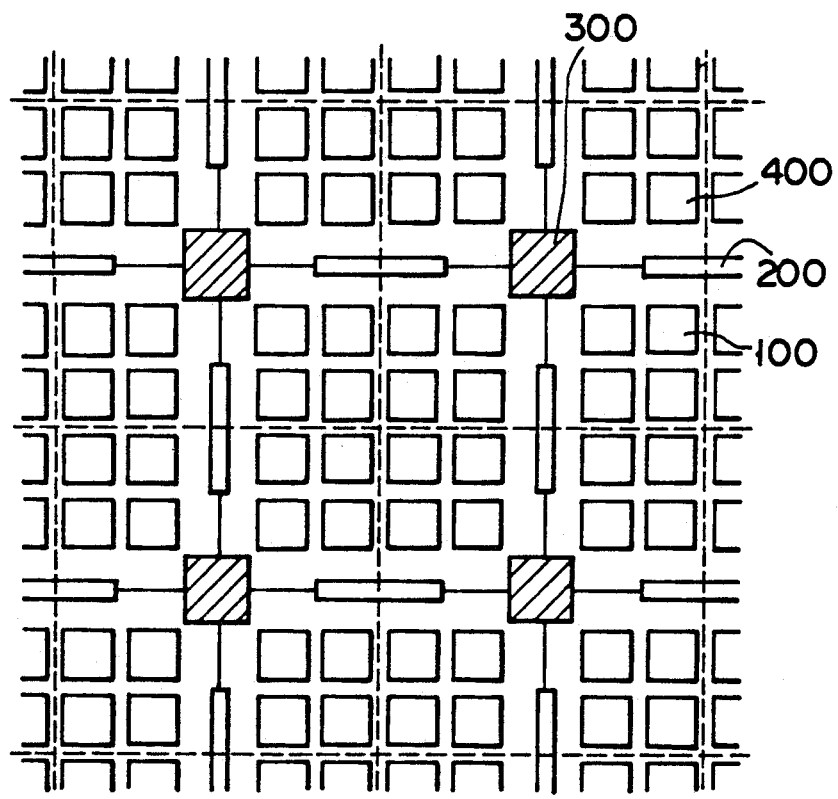
F I G. 15

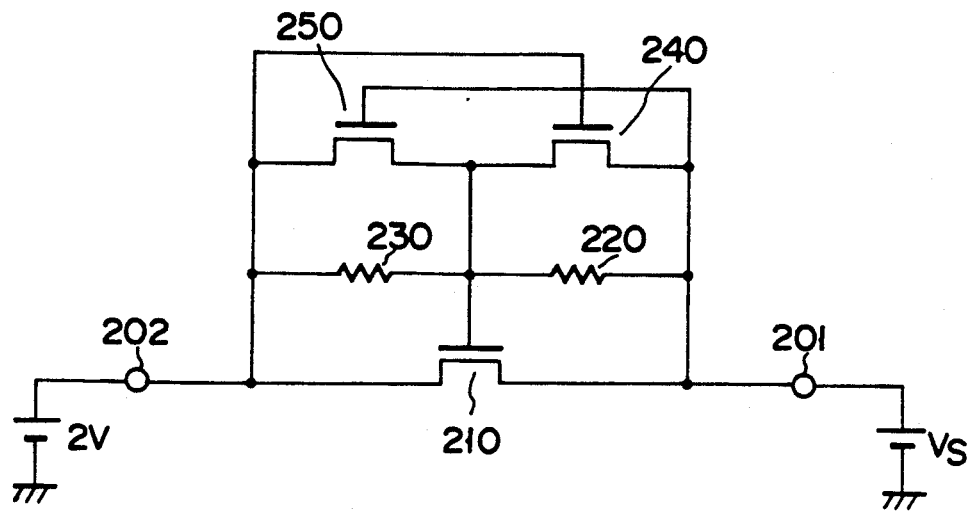
F I G. 24
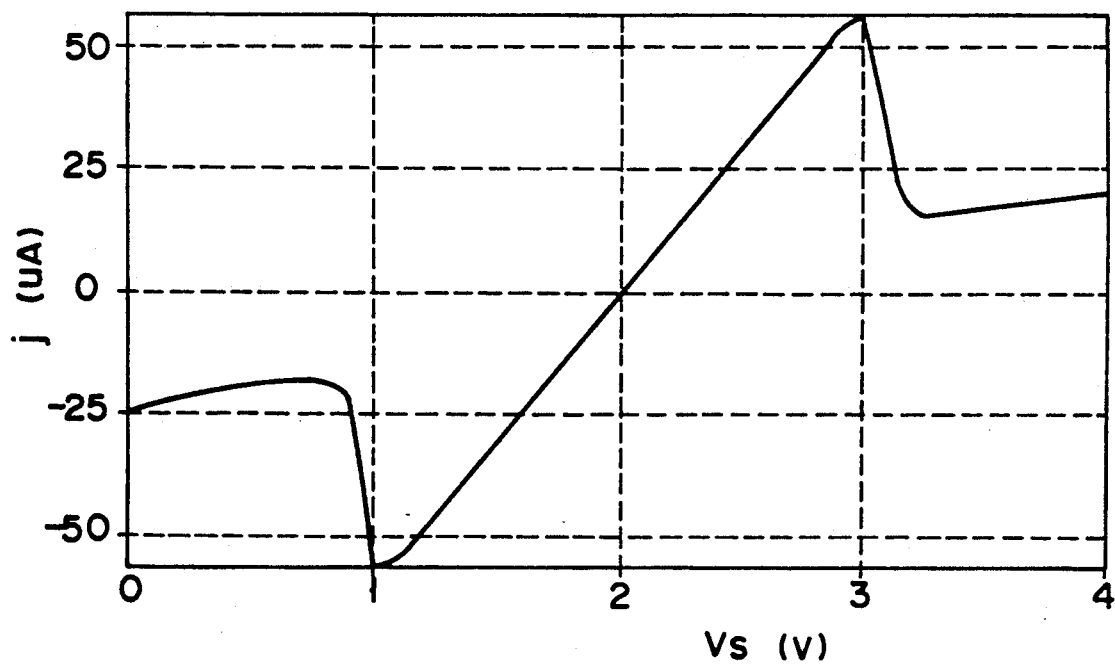
F I G. 25

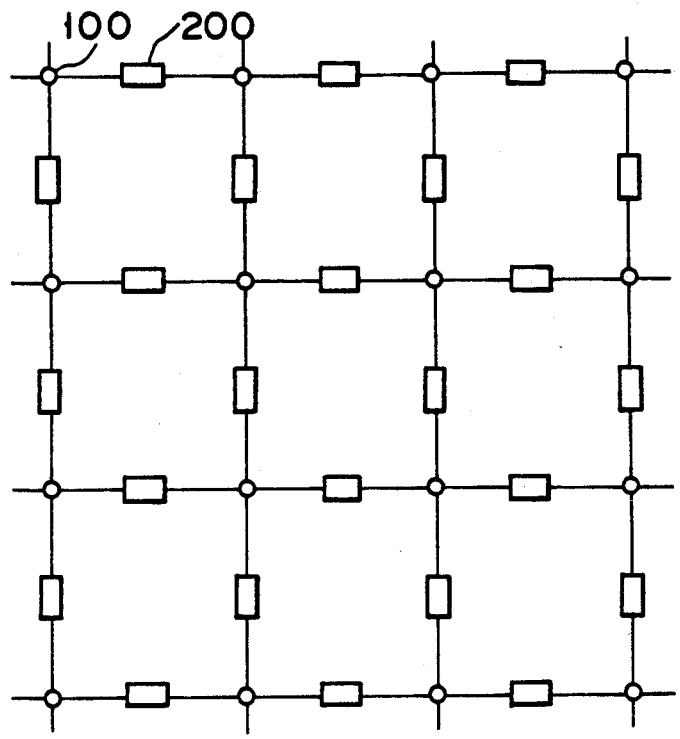
FIG. 29A
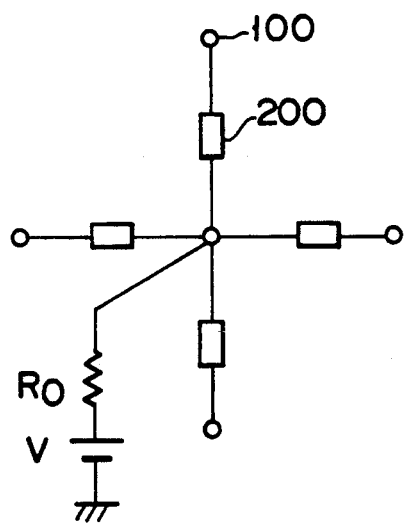 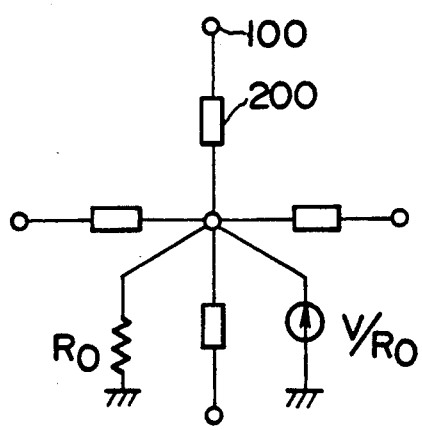
FIG. 29B  FIG. 29C

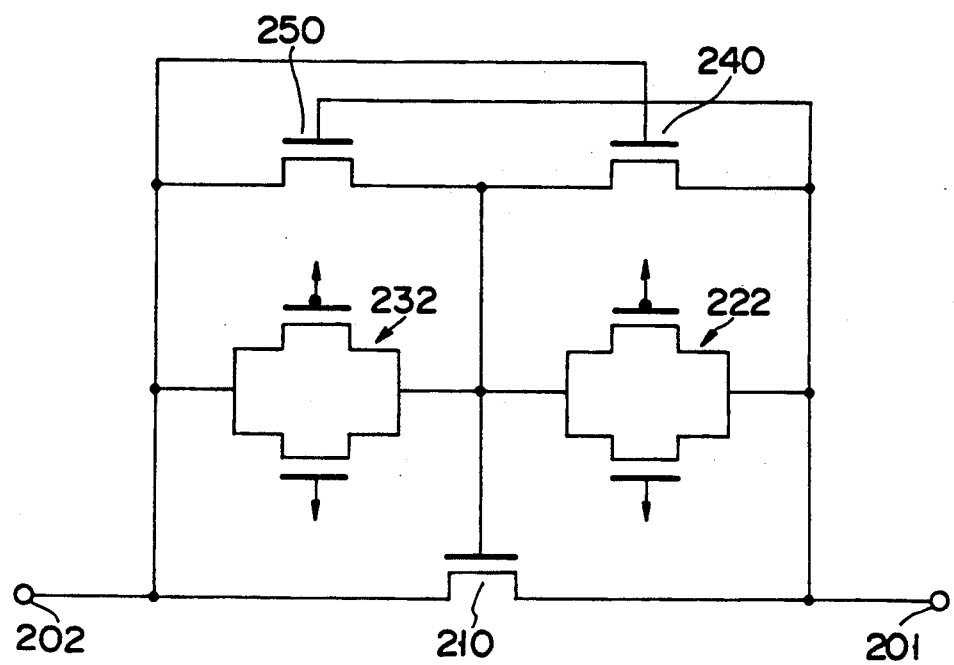
F I G. 31
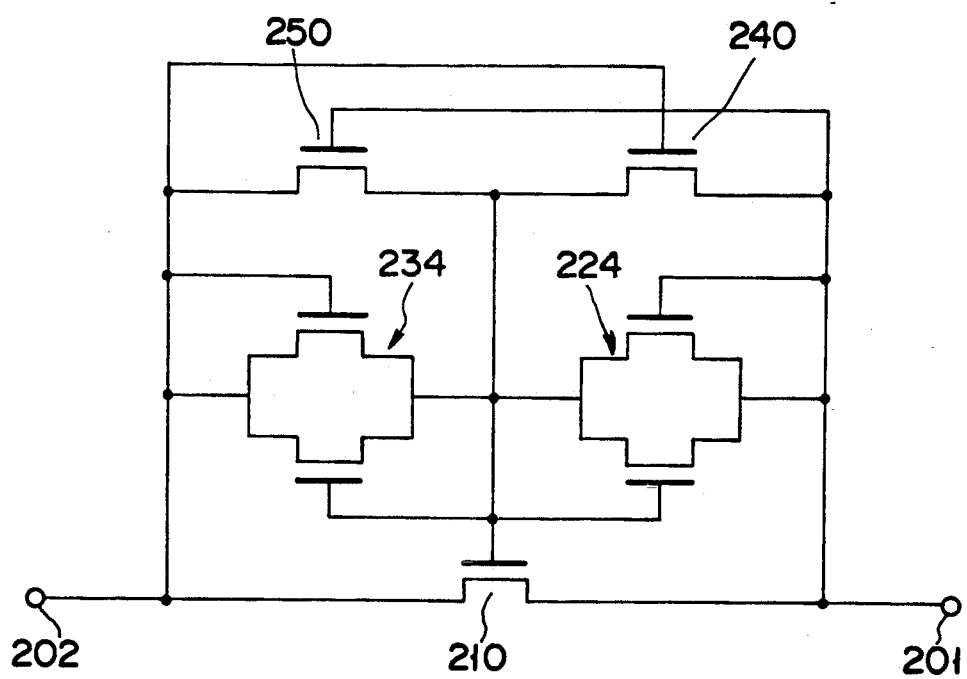
F I G. 32

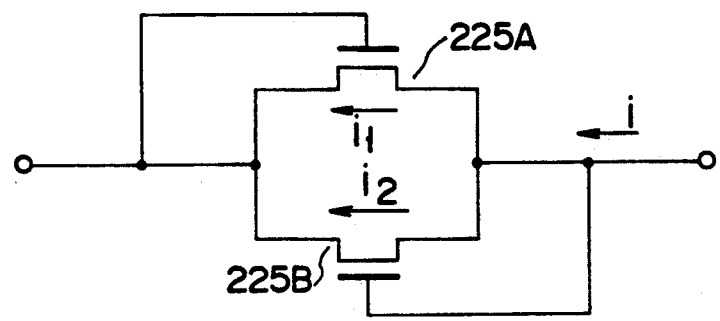
F I G. 33
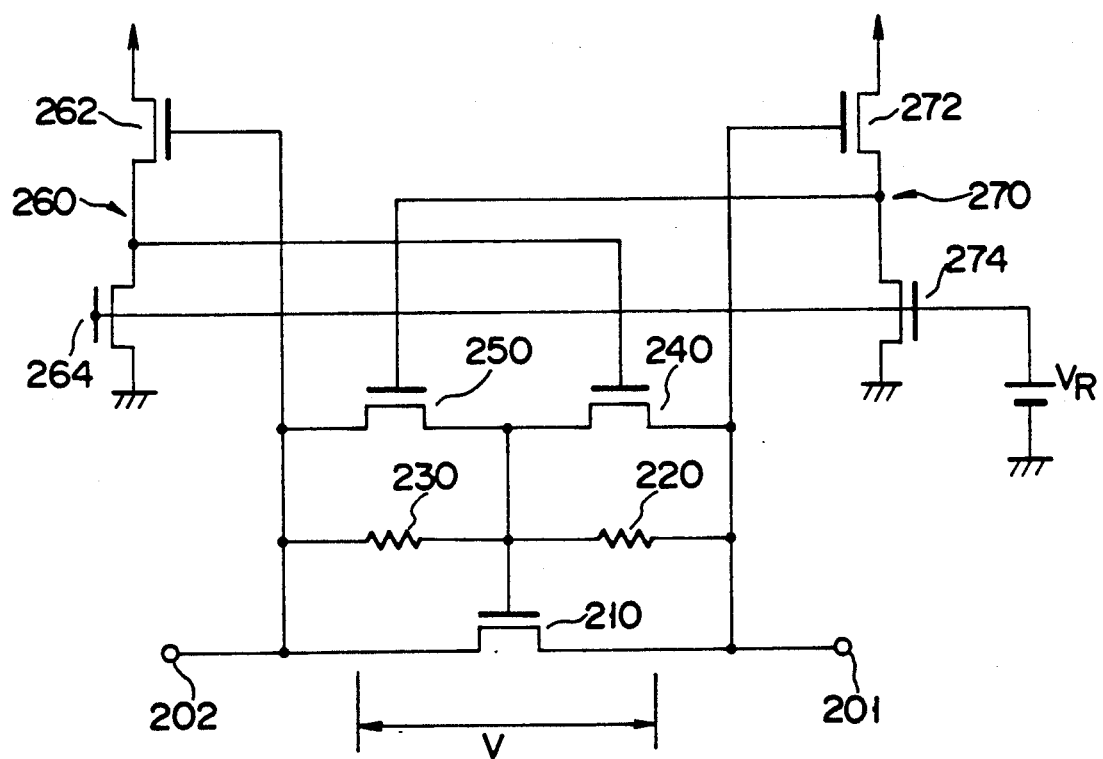
F I G. 34

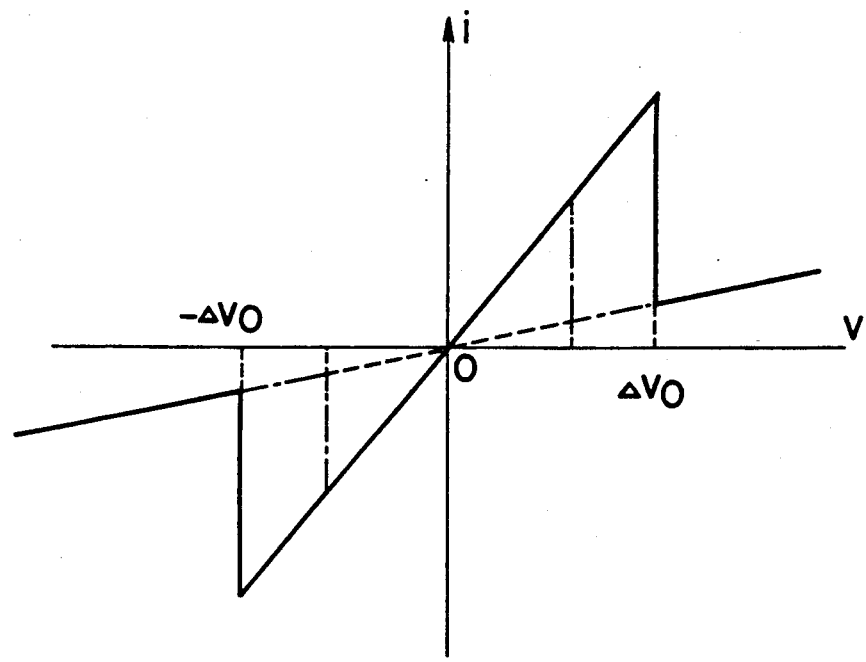
F I G. 35
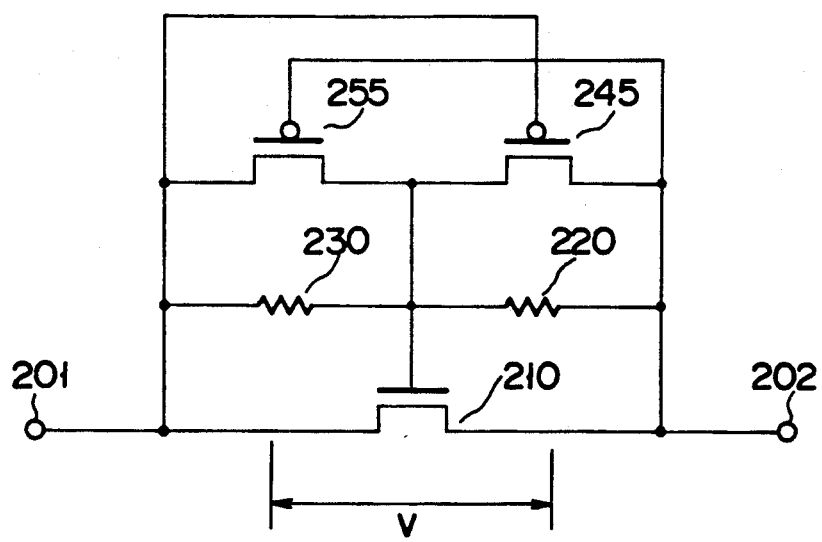
F I G. 36

SOLID STATE IMAGE SENSING DEVICE INCLUDING NONLINEAR CONVERSION PROCESSING OF INPUT LIGHT LEVELS

BACKGROUND OF THE INVENTION

1. Field of the Invention

The present invention relates to a solid state image sensing device in which the image quality of a reproduced image is improved, and a nonlinear resistor circuit suited to an analog image signal processor for use in the device.

2. Description of the Related Art

Recently, since a solid state image sensing device such as a CCD is smaller and lighter than a camera tube, it is often used in image sensing equipment for private use such as a home VCR. In addition, high-definition, low-noise image sensing equipment has been progressed as IC manufacturing techniques have been developed in these days.

However, the conventional solid state image sensing device had such as following problem. In an automatic diaphram the conventional solid state image sensing device, the diaphram mechanism is properly operated to a center pixel on a screen which is identified as a reference luminance. But since the diaphram is not properly operated for a pixel around the reference pixel having a extremely different from reference luminance, the image quality of a reproduced image is deteriorated.

In other hand, image processing techniques and applied techniques of the image processing techniques have been conspicuously developed to be widely applied in the fields of, e.g., a high-quality television, computer graphics, medical service, robot technology, and image recognition.

For example, image processing includes the following fields.

1) A field of reproduction of an original image, in which image transmission is performed and a detected image is reproduced and reconstructed.

2) A field of image conversion, in which a new image is formed from an original image, to emphasize information required by a user.

3) A field of recognition, in which an image further subjected to various processing steps is used to perform recognition at a higher level.

As described above, a range included in accordance with processing contents is very wide.

An image processing system will be described below as an image sensing system. The image sensing system, for example, has an arrangement as shown in FIG. 1.

An image signal output from an image sensing element (senor) 600 using, e.g., a CCD is converted into a digital signal by performing amplification, shaping and noise elimination by a pretreatment unit 610. Thereafter, the image signal is supplied to and processed by an exclusive digital signal processor 620. Since a large amount of data must be processed for the image signal, the pretreatment unit 610 and the digital signal processor 620, both of which can operate at a very high speed, are prepared to sequentially perform processing in units of pixels.

As described above, the conventional image processor is arranged to sequentially process all pixel information by using a small number of high-speed signal processing units. In order to process a larger number of pixels, a processor in which a large number of pixel signal processing units are arranged to process pixel signals in a pipeline manner is developed in consideration of the parallel processing. However, even when pixel signals are to be processed in a pipeline manner, signal processing for each pixel value must be performed at a considerably high speed.

An attempt has been made to execute image processing not sequentially by using a digital processing system but parallel by using an analog circuit network. In this attempt, a signal processing circuit for processing the luminance of a pixel constituted by a image sensing device such as a CCD is arranged for each pixel, and adjacent devices are coupled by a resistor element or a coupling circuit having a function equivalent to that of the resistor element, thereby arranged a circuit network for executing processing. This circuit network is suited to real-time signal processing because it performs arithmetic operations between the pixels completely parallel. An apparatus for executing processing using this circuit network realizes a high speed by the parallel operation of the processing system, and does not essentially depend on the advance in process techniques such as micropatterning of elements. Therefore, the apparatus can be manufactured at low cost.

For example, FIG. 2A shows a state of coupling of a circuit network in which pixels each constituted by a CCD image sensing device are arranged in a matrix form. Pixel value signal processors 100 arranged in a one-to-one correspondence with the pixels are coupled by coupling circuits (resistor elements) 200. FIG. 2B shows coupling of one pixel shown in FIG. 2A with adjacent pixels. A linear resistor, for example, is used as the coupling circuit 200. The function of the circuit network shown in FIGS. 2A and 2B is a Laplacian operation with respect to each pixel value. In other words, this function is of a spatial low-pass filter. Therefore, an output in which RF components such as noise components are reduced is obtained from the circuit network shown in FIGS. 2A and 2B.

FIG. 3A shows a circuit network as a low-pass filter in which pixels are arranged in a triangular form, and FIG. 3B shows coupling of one pixel shown in FIG. 3A with adjacent pixels. Although the circuit network shown in FIGS. 3A and 3B performs the Laplacian operation, it has an advantage of less image direction dependency than the circuit network of the matrix form shown in FIGS. 2A and 2B.

The characteristics of a linear circuit network according to the reference of C. Mead, Analog VLSI and Neural System, Reading, 1989, Addisson Wesly, Appendix C, will be described in detail below by taking a one-dimensional circuit network having an infinite length shown in FIG. 4 as an example in place of the above-mentioned two-dimensional resistor circuit networks.

In FIG. 4, assume that a voltage source $\{v_k\}_k$ is an input signal and a node potential series $\{u_k\}_k$ is an output signal. Since the system shown in FIG. 4 is linear, an input/output relationship is represented by an impulse response $\{h_k\}_k$ as follows:

$$u_k = h_k * v_k = \sum_n h_{k-n} \cdot v_n$$

The impulse response $\{h_k\}_k$ is calculated from the above equation. Assuming that $v_0 \neq 0$ and $v_k = 0$ ($k \neq 0$), the following equation is obtained by an Ohm's law and a Kirchholff's law:

$$i_{k-1} \cdot R_1 = u_{k-1} - u_k \quad (1)$$
$$i_k \cdot R_1 = u_k - u_{k+1}$$

$$\frac{i_k}{R_0} = i_{k-1} - i_k$$

By eliminating $i_{k-1}$ and $i_k$ from equation (1), the following equation (2) is obtained:

$$u_{k+1} - \left(2 + \frac{R_1}{R_0}\right)u_k + u_{k-1} = 0 \quad (2)$$

Assume that:

$$u_k = \gamma^k \cdot u_0 \quad (3)$$

In this case the following equation (4) is obtained:

$$\gamma^2 - \left(2 + \frac{R_1}{R_0}\right)\gamma + 1 = 0 \quad (4)$$

$$\gamma = 1 + \frac{R_1}{2R_0} - \sqrt{\frac{R_1}{R_0} + \frac{R_1^2}{4R_0^2}}$$

Note that only a solution of $0 < \gamma < 1$ is employed by a boundary condition $u_k \to 0$ ($k \to \infty$).

An initial value $u_0$ of equation (3) will be obtained. FIG. 5 shows an equivalent circuit of the circuit network shown in FIG. 4 obtained when an impulse signals input to $k=0$. Assuming that an input impedance of the entire network on the right side from a node $u_0$ (i.e., a network of $k > 0$) is $R_{in}$, when both sides of equation (1) for $k=0$, that is:

$$i_0 \cdot R_1 = u_0 - u_1$$

are divided by $u_0$, the following equations are obtained:

$$\frac{i_0}{u_0} R_1 = 1 - \frac{u_1}{u_0}$$

$$u_0/i_0 = R_{in}$$

Therefore, from $$r_{in}^{-1} \cdot R_1 = 1 - \gamma,$$

the following equation (5) is obtained:

$$R_{in} = \frac{R_1}{1 - \gamma} \quad (5)$$

Since the input impedance of the entire circuit network viewed from the input power source $v_0$ is $$R_0 + R_{in}//R_{in},$$

$u_0$ to be obtained is given by:

$$u_0 = v_0 \cdot \frac{R_{in}/2}{R_0 + R_{in}/2} \quad (6)$$

$$= \frac{v_0}{1 + 2R_0/R_{in}}$$

where $//$ is the arithmetic operation symbol indicating a resistance obtained when resistors are parallel-connected. When equation (6) is substituted into equation (3), the following equation (7) is obtained:

$$u_k = \frac{v_0}{1 + 2R_0/R_{in}} \cdot \gamma^{|k|} \quad (k = 0, \pm, \pm 2, \ldots) \quad (7)$$

Therefore, the impulse response of the circuit network shown in FIG. 4 is obtained as follows:

$$h_k = \frac{\gamma^{|k|}}{1 + 2(1 - \gamma)\frac{R_0}{R_1}} \quad (8)$$

That is, the impulse response of the circuit network shown in FIG. 4 has a shape horizontally symmetrically, exponentially decaying from an impulse input node as a vertex.

When the following equation (9) is substituted into equation (8), $$\alpha = \frac{1}{1 + 2(1 - \gamma)\frac{R_0}{R_1}} \quad (9)$$

$h_k$ is given as follows:

$$h_k = \alpha \gamma^{|k|} \quad (10)$$

A case wherein a step input is supplied to the circuit shown in FIG. 4 will be considered.
That is, when $$v_k \begin{bmatrix} v_s, k \geq 0 \\ 0, k < 0 \end{bmatrix} \quad (11)$$

is input, an output is given by:

$$u_k = h_k * v_k = \alpha v_s \cdot \sum_{n=0}^{\infty} \gamma^{|k-n|} \quad (12)$$

$$= \begin{bmatrix} \alpha v_s \cdot \frac{1 + \gamma^{-k+1}}{1 - \gamma}, k \geq 0 \\ \alpha v_s \cdot \frac{\gamma^{-k}}{1 - \gamma}, k < 0 \end{bmatrix}$$

FIG. 6 is a graph showing equation (12). As is apparent from FIG. 6, the circuit network shown in FIG. 4 has low-pass filter characteristics. FIGS. 7 and 8 show actual simulation results of a one-dimensional circuit network having 24 nodes, in each of which the abscissa indicates a node number and the ordinate indicates the voltage of a node. FIG. 7 shows an input signal, and FIG. 8 shows an output signal. The input signal is obtained by adding noise to a step signal which is not 0 when $k \leq 11$ but almost 0 when $12 \leq k \leq 24$. #n (n=1, 2, 3, and 4) indicates inputs obtained when an average value of $v_s$ is set to be 0.97, 1.95, 2.90, and 3.85. As shown in FIG. 8, the value of output signal smoothly changes around the step. As is apparent from equation (12), a degree of this "smoothness" is determined by $\gamma$ and by a resistance ratio $R_0/R_1$ from equation (4). Actually, $\gamma$ is monotonously decreased from 1 to 0 when the $R_1/R_0$ is increased. Therefore, the gradient of the curve shown in FIG. 8 is increased by increasing the $R_1/R_0$. This tendency is not limited to the one-dimensional circuit network as shown in FIG. 4 but almost similarly occurs in the two-dimensional circuit networks shown in FIGS. 2A to 3B.

When removing noise by an arithmetic operation using the linear circuit network for performing image signal processing parallel as described above, a signal is largely distorted to produce a "blur" in a portion where the signal value largely changes, i.e., a portion near the edge of image information, as shown in FIG. 8. This distortion makes it difficult to simultaneously perform noise removal and edge extraction from image information. Since, however, the above two processing steps are basic elements of the image processing, they are preferably performed at the same time.

In order to solve the above problem, there is proposed the use of a nonlinear resistor circuit in which the resistance nonlinearly changes in accordance with a voltage across the two terminals of the coupling circuit 200 shown in FIGS. 2 and 3 as the coupling circuit 200. The nonlinear resistor circuit basically has a low resistance at a threshold value or less at which a potential difference is present between the two terminals and a high resistance (including infinity) at the threshold value or more. There is the following relationship:

$$i_k = \frac{v_k}{R_1}$$

A function obtained when the nonlinear resistor circuit as described above will be described below by taking the one-dimensional circuit network shown in FIG. 4 as an example. In the one-dimensional resistor circuit network shown in FIG. 4, if resistors $R_1$ constituting the coupling circuit are linear resistors, each resistor $R_1$ is kept constant regardless of a potential difference between the two terminals of the resistor. Assuming that coupling obtained by the resistor $R_1$ is the "strength" of an interaction between nodes, this strength remains unchanged regardless of the state of the circuit network. Therefore, averaging and smoothing of pixel values are performed by this interaction. However, it is not checked whether a difference between two adjacent node signals is caused by noise or an edge. As shown in FIGS. 7 and 8, a step response in the linear resistor circuit network is smoothed by averaging and removing noise superposed on a step signal and averaging an edge portion at the same time.

The above nonlinear resistor circuit is applied as each resistor $R_1$ of the resistor circuit network as shown in FIG. 4. Whether a difference in node values between couplings is caused by discontinuity due to an edge or by noise is checked in accordance with a potential difference between the two terminals of the nonlinear resistor circuit, thereby determining whether averaging is to be performed. That is, if the potential difference between the two terminals of the coupling circuit is a predetermined threshold value or more, it is determined that the discontinuity is caused by an edge, and no averaging is performed. If the potential difference between the two terminals of the coupling circuit is the predetermined threshold value or more, it is determined that the discontinuity is caused by noise, and averaging is performed. In other words, the position of an edge is detected in accordance with whether the potential difference between the two terminals of the coupling circuit exceeds the threshold value, the circuit network is divided or formed into an independent network at the edge portion. If the potential difference between the two terminals of the coupling circuit exceeds the threshold value, averaging is not performed for the edge portion but performed in each independent network. Even when the circuit network is extended to be two-dimensional, the circuit network is disconnected with respect to a node potential change large enough to determine an edge, and no smoothing is performed, as in the one-dimensional circuit network.

The related arts cited in the above description are disclosed in the following references.

1) Wataru Miyao, Masaya Yabe ed., "Intellectualization Sensing", (Science Forum K. K.), pp. 169-185

2) J. Hutchinson et al., "*Computing Motion Using Analog and Binary Resistive Networks*", IEEE COMPUTER, Mar. 1988, pp. 52-63

3) H. Kobayashi et al., "*An Active Resistor Network for Gaussian Filtering of Image*", IEEE J. Solid State Circuits, Vol. 25, No. 5, May 1991, pp. 738-748

4) C. Mead and M. Mahowald, "*A Silicon Model of Early Visual Processing*", Neural Networks, Vol. 1 (1988), pp. 91-97

5) J. Harris, C. Koch, J. Luo and J. Wyatt, "*Resistive Fuses: Analog Hardware for Detecting Discontinuities in Early Vision*"; Analog VLSI implementation of neural system, 1989, Kluwer Academic Publishers 6) H. Hayashi et al., "*An Analog CMOS Network for Gaussian Convolution with Embedded Image Sensing*", 1990, IEEE International Solid-State Circuit Conference, pp. 216 (1990)

7) D. L. Standley et al., "*An Object Position and Orientation IC with Embedded Imager*", 1991 IEEE International Solid-State Circuit Conference, pp. 38 (1991)

8) C. Mead: "Analog VLSI and Neural Systems", Reading, Addisson Westey, 1989, APPENDIX C.

SUMMARY OF THE INVENTION

It is an object of the present invention to provide a solid state image sensing device having a diaphragm mechanism which effectively acts on the entire pixel screen, and a nonlinear resistor circuit applied to the solid state camera tube device and capable of being realized by an NMOS circuit arrangement which can be formed by the same process as a CCD.

The first aspect according to the present invention is characterized by a solid state image sensing device comprising: signal charge storage units, arranged in a matrix on a semiconductor substrate, for storing a signal charge generated by photoelectric conversion; signal charge reading units for reading out the signal charge from said signal charge storage units; a pixel signal processing unit, provided in each of a plurality of blocks obtained by dividing the matrix of said signal charge storage units, for detecting a luminance to output a control signal corresponding to the luminance; and a signal charge extracting unit provided adjacent to each of said signal charge storage units and controlled by the control signal obtained in a corresponding block to extract an excessive signal charge from said signal charge storage unit of the block.

It is sometimes desired that the adjacent image signal processing units are connected via a coupling element. When a linear resistor is used as the coupling element, a brightness change is smoothly interpolated. If the brightness is extremely different between the adjacent image signal processing units, no smoothing is preferably performed. In this case, therefore, a nonlinear resistor circuit according to the second aspect of the present invention is preferably used.

The second aspect according to the present invention is characterized by, when a nonlinear resistor circuit is used as the coupling element for connecting adjacent image signal processing units in the first aspect of the present invention, a first MOS transistor having a drain connected to a first terminal and a source connected to a second terminal; a first resistor element connected between the gate and drain of said first MOS transistor; a second resistor element connected between the gate and source of said first MOS transistor; a second MOS transistor having a drain connected to the drain of said first MOS transistor, a source connected to the gate of said first MOS transistor, and a gate connected to the source of said first MOS transistor; and a third MOS transistor having a source connected to the source of said first MOS transistor, a drain connected to the gate of said first MOS transistor, and a gate connected to the drain of said first MOS transistor.

In the solid state image sensing device according to the first aspect of the present invention, a pixel screen is divided into a plurality of blocks, and pixel signal processing units are arranged in each blocks, and a signal charge in an amount corresponding to a luminance detected in each block is extracted from a signal charge storage unit in the block. Therefore, diaphragm adjustment can be performed more properly.

In addition, in the solid state image sensing device according to the first aspect of the present invention, diaphragm adjustment is performed such that a signal charge in an amount corresponding to the luminance of each block is extracted from the signal charge storage unit of the bock. Therefore, even if a region having a luminance largely different from those in other regions is present on the pixel screen, proper diaphragm adjustment is performed to obtain a reproduced image with high image quality.

When adjacent pixel signal processing units are connected via a coupling element, a signal charge extracting unit of each block is applied with a control signal obtained by taking also an average luminance in portions close to the block into consideration. As a result, even if the average luminance of the pixel signal processing unit discontinuously changes, the control signal smoothly changes to prevent deterioration in image quality of a reproduced image.

Furthermore, by connecting the block having no pixel signal processing unit to an adjacent block through connection element, an interpolation function can be performed that the luminance of the block having no pixel signal processing unit is estimated to that of adjacent block.

In the nonlinear resistor circuit according to the second aspect of the present invention, when the drain potential of the first MOS transistor is much higher than its source potential, the second MOS transistor connected to its source is turned off. In addition, the gate and drain of the first transistor are connected via a resistor, and its gate and source are connected via a parallel circuit of the resistor and the third MOS transistor. Therefore, the gate potential of the first MOS transistor is located close to its source, and a high impedance is obtained in its drain-source path. If, on the other hand, the drain-source potential of the second MOS transistor is lower than the threshold voltage of the transistor, both the second and third MOS transistors are kept off, and the gate potential of the first MOS transistor becomes intermediate between the drain and source potentials due to resistance division. Therefore, the impedance of the drain-source path of the first MOS transistor is decreased.

As described above, the drain-source impedance of the first MOS transistor discontinuously changes in accordance with the potential differential between the two terminals, i.e., becomes low when the potential difference is small and high when it is large. That is, a nonlinear resistor circuit which can be realized by an NMOS circuit arrangement is obtained.

In addition, by the nonlinear resistor circuit according to the second aspect of the present invention, there is provided a nonlinear resistor circuit having an arrangement suited to a CCD process, in which a resistance nonlinearly changes in accordance with a potential difference between the two terminals. When an analog image signal processor is arranged by using the nonlinear resistor circuit according to the second aspect of the present invention as a coupling circuit between pixel value signal processing circuits, both of removal of noise and extraction and holding of an edge, which are difficult to perform when using a linear resistor circuit, can be effectively performed.

As described above, according to the image sensing device of the first aspect of the present invention, a diaphragm is effectively operated on the entire pixel screen. In addition, more effective control can be performed by connecting adjacent image sensing devices of the first aspect by the nonlinear resistor circuit of the second aspect.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 is a view showing a potential distribution in the pixel unit;

FIG. 13 is a view showing a potential distribution in the pixel unit;

FIG. 14 is a graph showing a relationship between a light quantity and a signal charge;

FIG. 15 is a schematic view showing an arrangement of a solid state image sensing device according to the second embodiment of the present invention;

FIG. 24 is a circuit diagram showing a nonlinear resistor circuit used in a solid state image sensing device according to the fifth embodiment of the present invention;

FIG. 25 is a graph showing static characteristics of the nonlinear resistor circuit shown in FIG. 24;

FIGS. 29A to 29C are views for explaining a two-dimensional matrix circuit network using the nonlinear resistor circuit of the present invention;

FIG. 31 is a circuit diagram showing a nonlinear resistor circuit used in a solid state image sensing device according to the sixth embodiment of the present invention;

FIG. 32 is a circuit diagram showing a nonlinear resistor circuit used in a solid state image sensing device according to the seventh embodiment of the present invention;

FIG. 33 is a circuit diagram showing a part of FIG. 3 in detail;

FIG. 34 is a circuit diagram showing a nonlinear resistor circuit used in a solid state image sensing device according to the eighth embodiment of the present invention;

FIG. 35 is a graph showing static characteristics of the nonlinear resistor circuit shown in FIG. 34; and FIG. 36 is a circuit diagram showing a nonlinear resistor circuit used in a solid state image sensing device according to the ninth embodiment of the present invention.

DETAILED DESCRIPTION OF THE PREFERRED EMBODIMENTS

Embodiments of the present invention will be described below with reference to the accompanying drawings.

Embodiment 1

Figure 9:
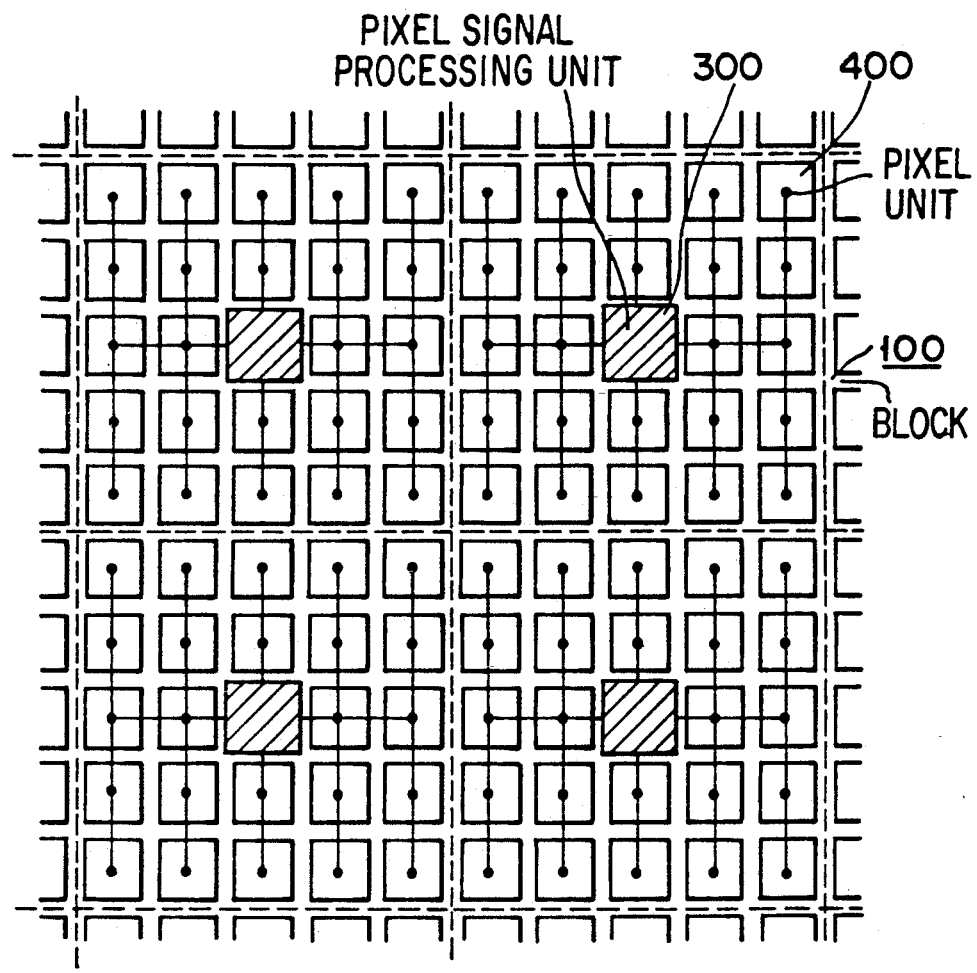
FIG. 9 is a schematic view showing an arrangement of a solid state image sensing device according to the first embodiment of the present invention.

FIG. 9 is a schematic view showing an arrangement of a solid state image sensing device according to the first embodiment of the present invention.

On a pixel screen of a solid state image sensing device of this embodiment, a plurality of pixel units 400 are arranged in a matrix manner. Each pixel unit 400 is constituted by a photodiode for storing a signal charge by photoelectric conversion, and a CCD for transferring and reading out the signal charge of the photodiode.

The pixel screen is divided into a plurality of blocks 100, and a pixel signal processing unit 300 is provided in each block. The pixel signal processing unit 300 detects the luminance of a point in the unit and extracts an excessive amount of a signal charge of the pixel unit 400 in the corresponding block. The pixel unit 400 has a signal charge extracting unit (to be described later).

Figure 10:
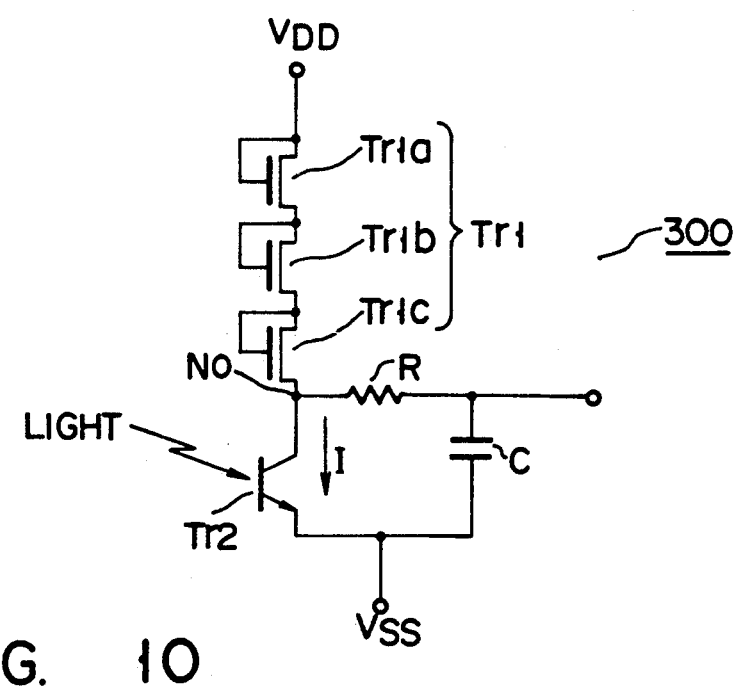
FIG. 10 is a circuit diagram showing an example of a pixel signal processing unit shown in FIG. 9.

As shown in FIG. 10, the pixel signal processing unit 300 is constituted by a load transistor Tr1, a phototransistor Tr2, a resistor element R, and a capacitor C. The load transistor Tr1 has a terminal connected to a power source potential $V_{DD}$ at a high potential, and is constituted by series-connected MOS transistors Tr1a, Tr1b, and Tr1c. The collector of the phototransistor Tr2 is connected to the other terminal of the load transistor Tr1, and its emitter is connected to a power source potential $V_{SS}$ at a low potential. The resistor element R is connected in series between the emitter and the collector of the phototransistor Tr2. The MOS transistors Tr1a, Tr1b, and Tr1c are diode-connected.

When light is radiated on the pixel signal processing unit 300, a current I is flowed through the collector-to-emitter path of the phototransistor Tr2 by its photoelectric conversion. Since the current I is small, the MOS transistors Tr1a, Tr1b, and Tr1c operate in a subthreshold region. Therefore, a voltage at a node NO between the emitter and the source can be approximately represented by the following equation (1):

$$V_o = V_{DD} - K \cdot \log I \quad (1)$$

where K is the factor of proportionality. Tr1 is consist of three MOS transistor in this embodiment, but the number of transistors is not limited. The K is proportional to the number of series-connected MOS transistor consisting Tr1.

The voltage Vo represented by equation (1) is averaged in terms of time by an integral circuit constituted by the resistor element R and the capacitor C and supplied to the pixel unit 400 as a control voltage.

Figure 11A:
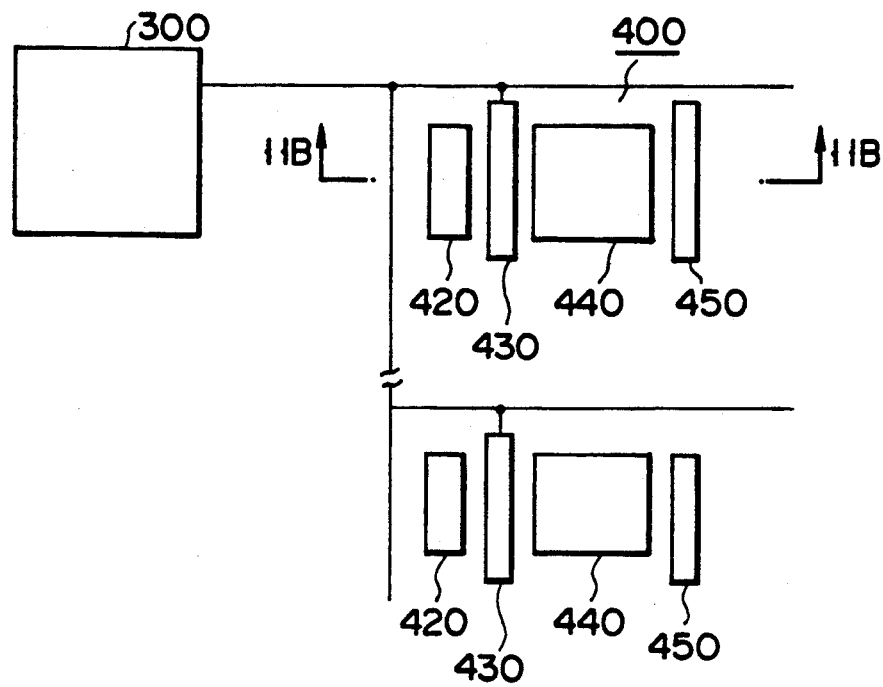
FIG. 11A is a view showing a pixel unit shown in FIG. 9 in detail.
Figure 11B:
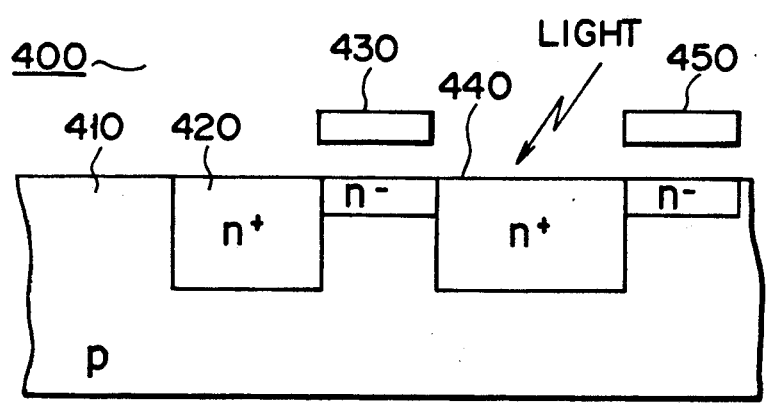
FIG. 11B is a sectional view taken along a line 11B—11B in FIG. 11A.

FIG. 11A is a plan view showing the pixel unit 400, and FIG. 11B is a sectional view taken along a line 11B—11B of the pixel unit 400.

The pixel unit 400 is formed in a p-type well 410 on a semiconductor substrate. A photoelectric conversion unit/signal charge storage unit is constituted by a photodiode 440 consisting of an n+-type layer. A signal charge reading unit is constituted by a CCD channel (not shown) and a first transfer gate 450 for transferring a signal charge of the photodiode 440 to the CCD channel. A signal charge extracting unit is constituted by a bias node 420 consisting of a heavily doped n+-type layer applied with a predetermined voltage, and a second transfer gate 430 arranged between the bias node 420 and the photodiode 440 and controlled by the control signal voltage Vo from the pixel signal processing unit 300.

FIGS. 12 and 13 are views showing immediate potential distributions in the pixel unit 400 after the first transfer gate 450 is set in a transfer state (ON) while the solid state camera tube device having the arrangement as shown in FIGS. 11A and 11B is irradiated with light.

In FIGS. 12 and 13, $E_{SS}$ and $E_{DD}$ denote potential levels of the second transfer gate 430 when $V_o = V_{SS}$ and $V_o = V_{DD}$. A hatched portion D indicates a charge generated in the photodiode 440. Since the output voltage Vo from the pixel signal processing unit 300 is applied to the second transfer gate 430, a value obtained by subtracting $E_{DD}$ from the potential level of the second transfer gate 430 is proportional to the output voltage from the pixel signal processing unit 300, i.e., proportional to logI.

FIG. 12 shows a case wherein a light quantity Q radiated on the photodiode 440 is small. Assume that a light quantity $Q_1$ represents a light quantity generated in the photodiode 440 by electrons having an energy lower than the potential of the second transfer gate 430 and $Q_2$ represents a light quantity when an potential level equals to $E_{SS}$. If $Q \leq Q_1$, an electric charge in the hatched portion D is entirely transferred to the CCD channel through the first transfer gate 450. As a result, a signal charge $L_{CTL}$ almost proportional to the light quantity Q ($Q \leq Q_1$) is obtained from the photodiode 440, as shown in FIG. 14.

FIG. 13 shows a case wherein a light quantity radiated on the photodiode 440 is medium. When the control signal voltage Vo from the pixel signal processing unit 300 drops to decrease the potential of the second transfer gate 430 to be lower than Fermi surface of a diode (i.e., when a barrier is low), an electric charge in a hatched portion $D_2$ flows into the bias node 420 over the potential barrier of the second transfer gate 430 before transfer gate 450 is set in a transfer state (ON). An electric charge in the hatched portion $D_1$ flows into the CCD channel as the signal charge $L_{CTL}$ via the first transfer gate 450.

Since the value obtained by subtracting $E_{DD}$ from the potential level of the first transfer gate 450 is proportional to logI, an amount of electric charge read out by the second transfer gate 430 is proportional to a logarithm of the light quantity radiated on the photodiode 440. Therefore, the signal charge $L_{CTL}$ logarithmically proportional to the light quantity Q ($Q_1 < Q < Q_2$) is extracted from the photodiode 440, as shown in FIG. 14.

When the light quantity radiated on the photodiode 440 is large ($Q \geq Q_2$), i.e., in a saturated state, a predetermined amount of the signal charge $L_{CTL}$ is read out from the photodiode 440 to the CCD channel regardless of the light quantity Q, as shown in FIG. 14.

Since diaphragm adjustment is performed in each block in accordance with the light quantity radiated on the corresponding pixel signal processing unit 300, a reproduced image with high image quality can be obtained. In addition, in this embodiment, luminance signal compression is performed by linearly, logarithmically changing the level of the signal charge $L_{CTL}$ in accordance with the light quantity. Therefore, diaphragm adjustment can be performed in a wide range as compared with conventional arrangements in which the level of the signal charge $L_{CTL}$ is changed only linearly.

In this embodiment, the control voltage Vo corresponding to the light quantity radiated on each pixel signal processing unit 300 is supplied to the pixel unit 400, and a signal charge in an amount corresponding to the control voltage Vo is extracted from the photodiode 440 of the pixel unit of each block, thereby performing diaphragm adjustment. Therefore, there is provided a compact and inexpensive solid state image sensing device which does not deteriorate image quality even if a portion having a different luminance is present on the pixel screen.

Embodiment 2

FIG. 15 is a schematic view showing an arrangement of a solid state image sensing device according to the second embodiment of the present invention. The same reference numerals as in FIG. 9 denote the same parts in FIG. 15 and a detailed description thereof will be omitted.

The solid state image sensing device shown in FIG. 15 differs from the solid state image sensing device described in the first embodiment in that adjacent pixel signal processing units 300 are connected via coupling elements, e.g., resistor elements 200 so that an extraction amount of a signal charge from a pixel unit 400 is determined by control voltages Vo of a plurality of pixel signal processing units 300.

Figure 16:
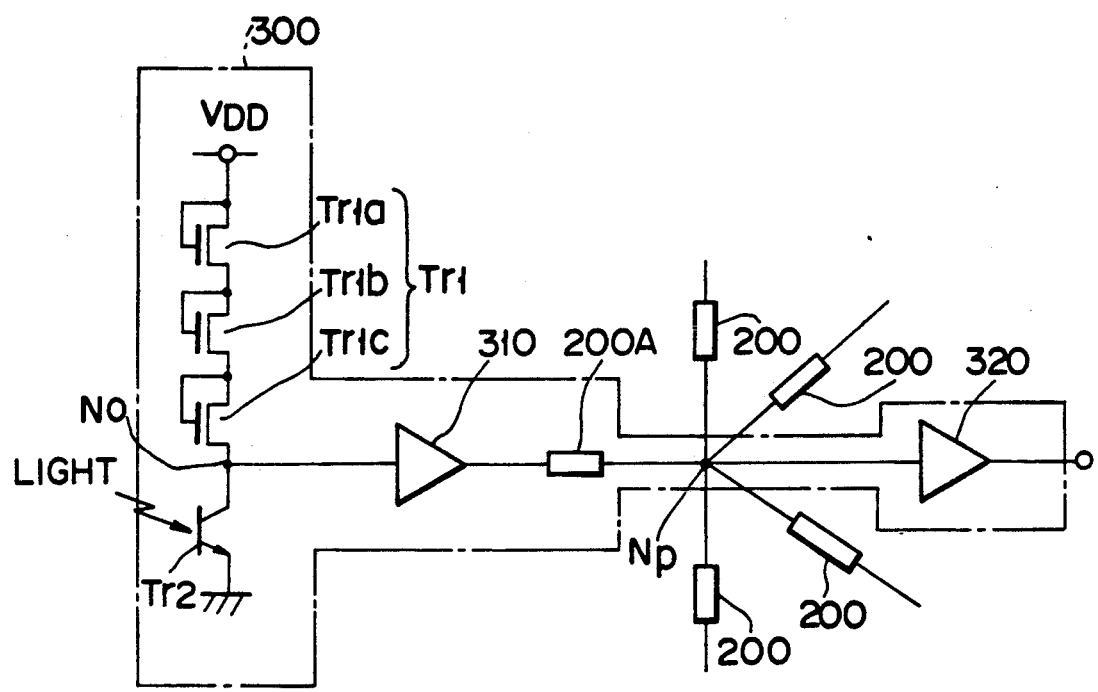
FIG. 16 is a circuit diagram showing an example of a pixel signal processing unit shown in FIG. 15.

As shown in FIG. 16, each pixel signal processing unit 300 is constituted by a load transistor Tr1, a phototransistor Tr2, a buffer amplifier 310, and a buffer amplifier 320. The load transistor Tr1 has a terminal (drain) connected to a power source potential $V_{DD}$ as a high potential and is constituted by three series-connected MOS transistors Tr1a, Tr1b, and Tr1c. The collector of the phototransistor Tr2 is connected to the other terminal (source) of the transistor Tr1, and its emitter is connected to a power source potential $V_{SS}$ at a low potential. The buffer amplifier 310 is connected to a node No between the collector of the phototransistor Tr2 and the source of the transistor Tr1c. The buffer amplifier 320 is connected to the buffer amplifier 310 via a resistor element 200A. A node $N_P$ between the resistor element 200A and the buffer amplifier 320 is connected to an adjacent pixel signal processing unit 300 via the resistor element 200.

In the pixel signal processing unit 300 having the above arrangement, a control voltage signal is supplied not only to the pixel unit 400 via the buffer amplifier 310, the resistor element 200A, and the buffer amplifier 320 but also to the pixel signal processing unit of an adjacent pixel via the buffer amplifier 310, the resistor element 200A, and the resistor element 200.

Figure 17A:
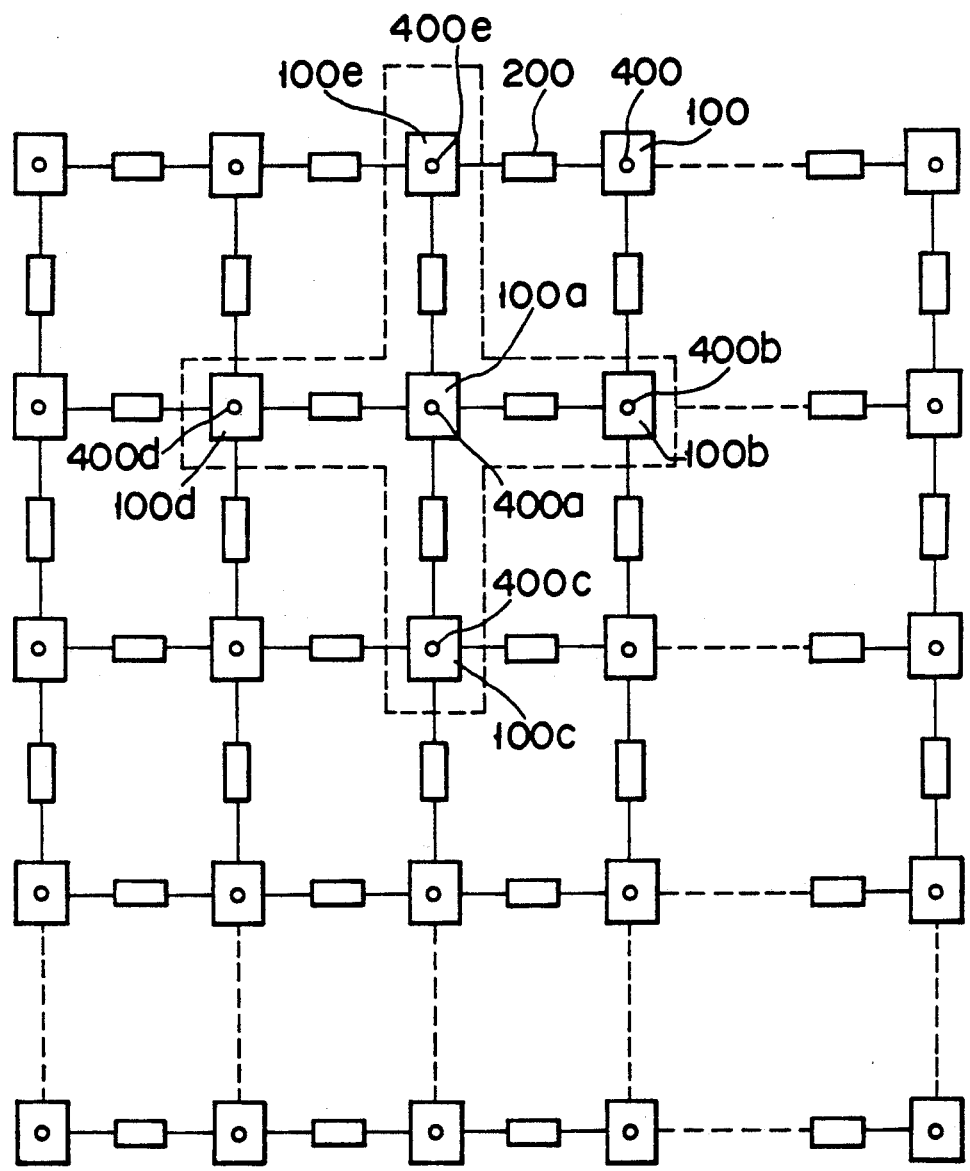
FIGS. 17A and 17B are views showing an equivalent circuit network of the pixel signal processing unit shown in FIG. 15.

FIG. 17A shows an equivalent circuit network of the solid state image sensing device having the arrangement as shown in FIG. 16. The circuit network shown in FIG. 17A is known as a spatial low-pass filter. The spatial low-pass filter as shown in FIG. 17A will be described below with reference to FIGS. 18 and 19 assuming that the filter is one-dimensional.

Figure 18:
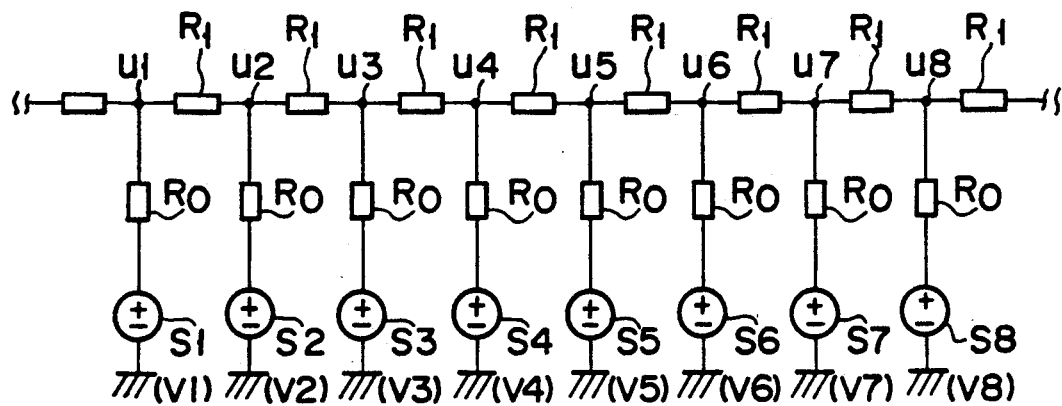
FIG. 18 is a view showing a one-dimensional low-pass filter.

Referring to FIG. 18, voltage sources S1 to S8 correspond to the pixel signal processing units 300 in the first embodiment, and input voltages v1 to v8 correspond to the control voltage Vo at the node No shown in FIG. 10. Each of nodes N1 to N8 of the circuit network shown in FIG. 18 is applied with a voltage of a corresponding one of the voltage sources S1 to S8, connected to the node via a resistor element $R_O$, and voltages of voltage sources connected to other nodes. For example, the node N1 is applied with voltages of the voltage sources S2 to S8.

Figure 19:
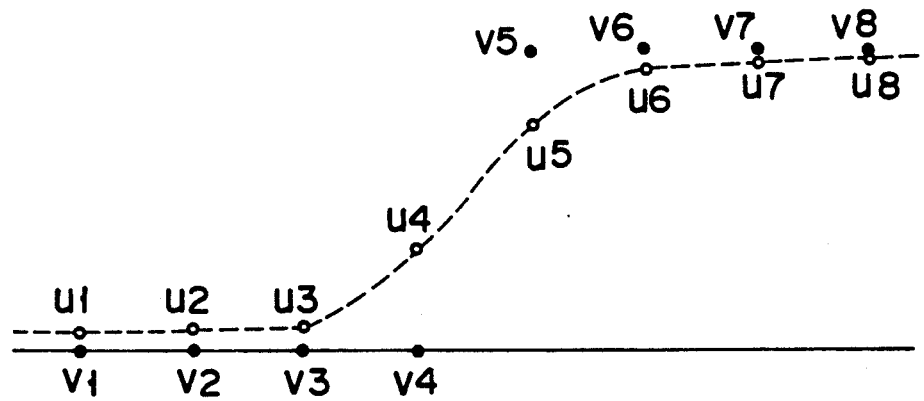
FIG. 19 is a view for explaining the function of the one-dimensional low-pass filter.

Assume that the input voltages v1 to v4 from the power sources S1 to S4 are at low level and the input voltages v5 to v8 from the power sources S5 to S8 are at high level. In this case, as shown in FIG. 19, voltages u1, u2, and u3 at the nodes N1, N2, and N3 go to low level like the input voltages v1, v2, and v3, and voltages u6, u7, and u8 at the nodes N6, N7, and N8 go to high level like the input voltages v6, v7, and v8. Voltages u4 and u5 at the nodes N4 and N5 go to medium level because the output voltages from the voltage sources connected to the nodes N4 and N5 are different. As shown in FIG. 19, the voltage at the node smoothly changes even if the input voltage discontinuously changes.

The above function in a region surrounded by a broken line in the two-dimensional circuit network shown in FIG. 17A will be described. A pixel value signal processing unit 400a of a pixel circuit 100a is applied with a control voltage from a pixel value signal processing unit 400b of a pixel circuit 100b, a control voltage from a pixel value signal processing unit 400c of a pixel circuit 100c, a control voltage from a pixel value signal processing unit 400d of a pixel unit 100d, and a control voltage from a pixel value signal processing unit 400e of a pixel circuit 100e. This means that a signal charge in an amount obtained by taking also the luminance of each of the pixels value signal processing units 400b, 400c, 400d, and 400e into consideration is extracted from a photodiode in the pixel value signal processing unit 400a. As a result, nonuniformity in a reproduced image can be lower by an influence of such as characteristic dispersion of an element.

In this embodiment, since the pixel units 400 connected via the resistor elements 200 are arranged in a matrix manner, an effect similar to that obtained in the first embodiment can be obtained. In addition, an amount of a signal charge to be extracted from each photodiode is determined in consideration of also light radiated on pixel signal processing units adjacent to the photodiode. Therefore, even if a region where radiated light discontinuously changes is present on the pixel screen, deterioration in image quality of a reproduced image can be reduced.

Figure 17B:
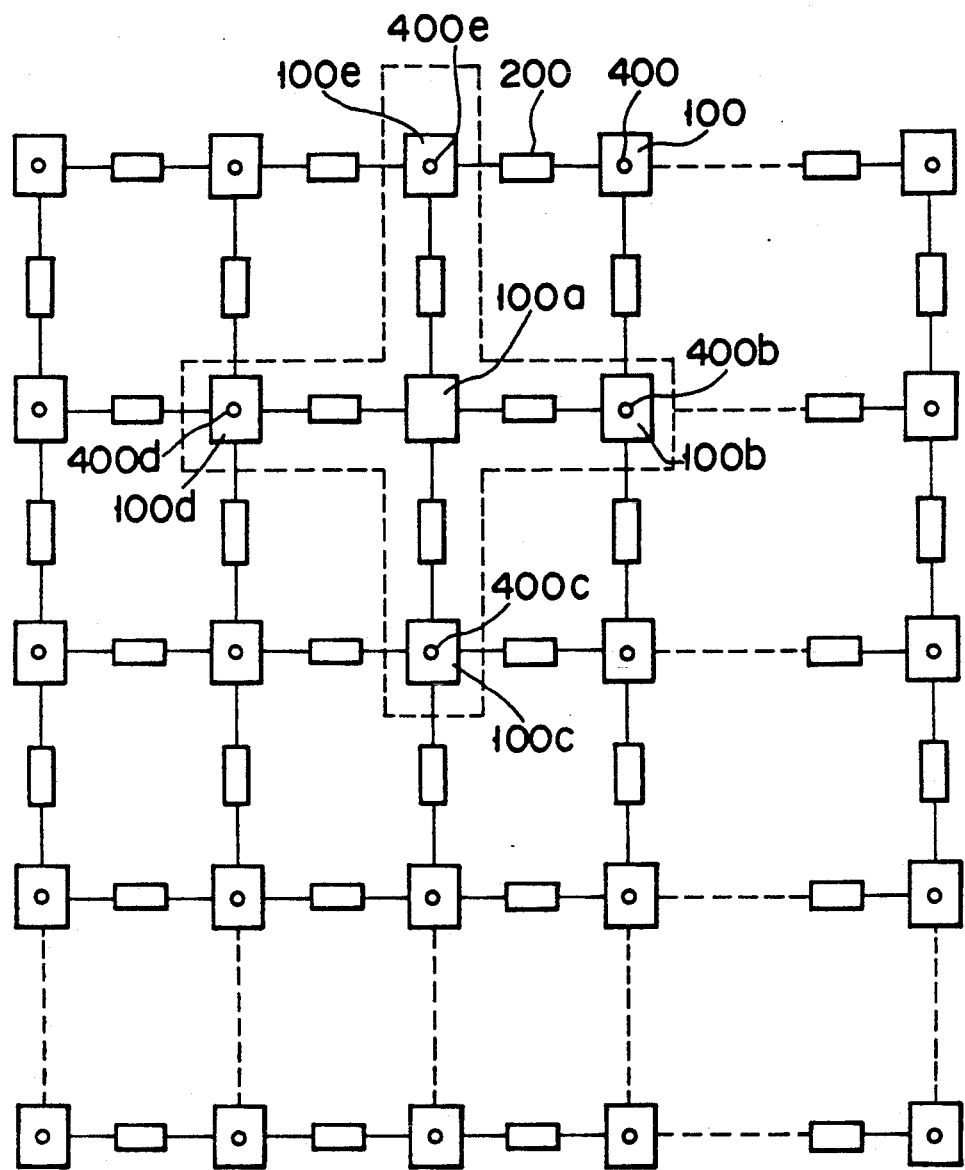

A circuit network shown in FIG. 17B is substantially same as that of FIG. 17A and shows pixel unit 100a having no pixel value signal processing unit 400a. The circuit shown in FIG. 17B is equivalent to that of FIG. 16 which the pixel value signal processing unit 300 has only Buffer 320. In FIG. 17B, control voltage of corresponding pixel is determined by the interpolation from adjacent pixel value. Therefore, even if pixel unit having no pixel value signal processing unit, the voltage of pixel unit connected to adjacent pixel unit by connection element is interpolated from around pixel unit.

Embodiment 3

Figure 20:
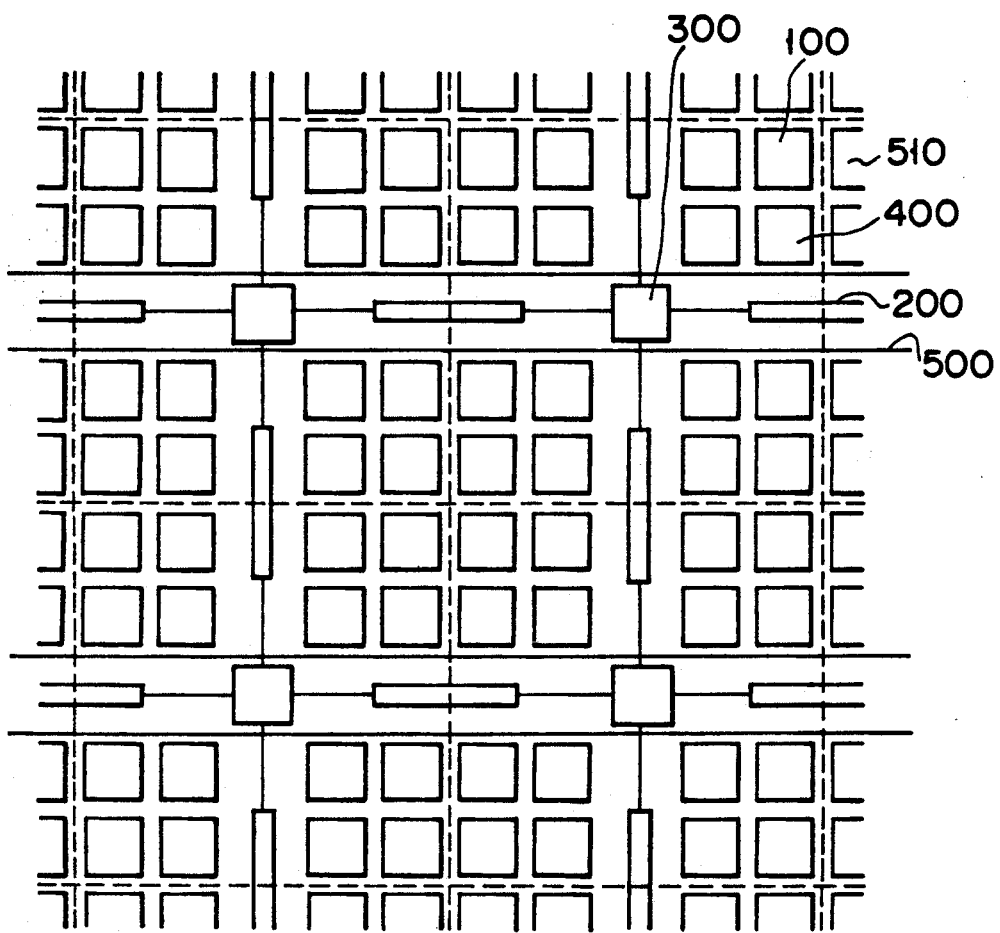
FIG. 20 is a schematic view showing an arrangement of a solid state image sensing device according to the third embodiment of the present invention.

FIG. 20 is a schematic view showing an arrangement of a solid state image sensing device according to the third embodiment of the present invention.

This embodiment differs from the solid state image sensing device described in the second embodiment in that picture signal processing units 300 and pixel units 400 are formed in different wells 500 and 510.

Also in the solid state image sensing device having the arrangement as shown in FIG. 20, not only an effect similar to that in the second embodiment can be obtained, but also biases for an analog circuit system of the pixel signal processing unit 300 and a CCD system of the pixel unit 400 can be set independently of each other. In addition, signal leakage from the pixel signal processing unit 300 to the pixel unit 400 or vice versa can be prevented.

Embodiment 4

Figure 21:
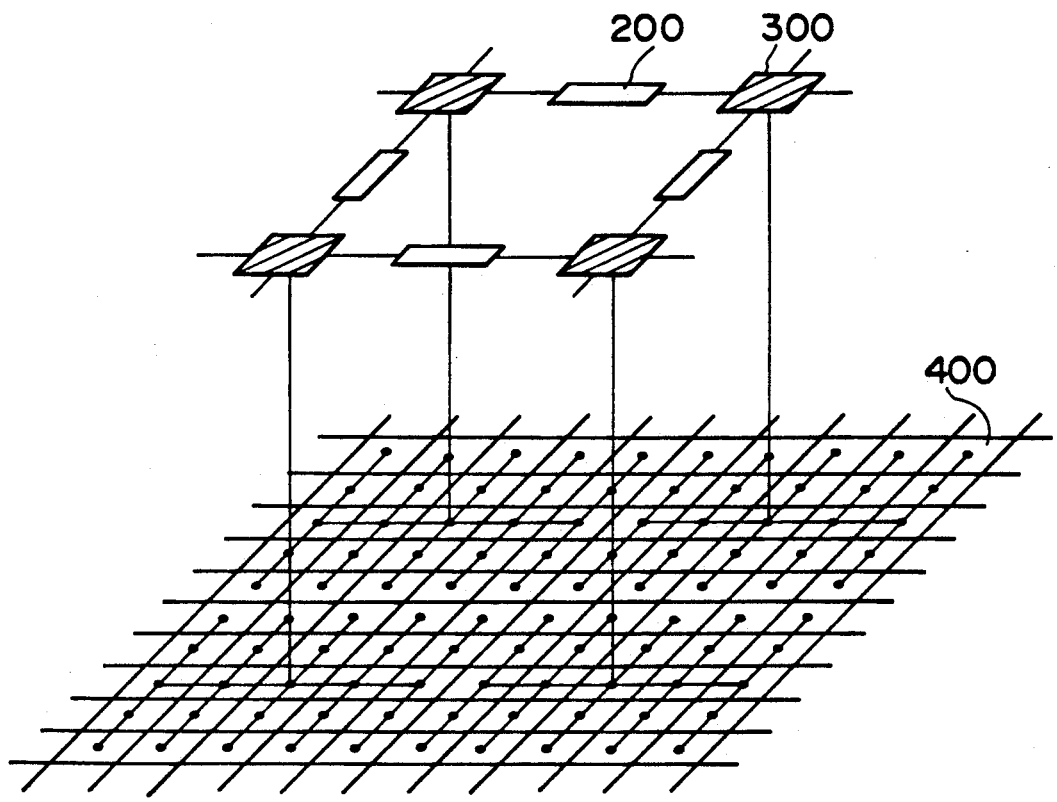
FIG. 21 is a schematic view showing an arrangement of a solid state image sensing device according to the fourth embodiment of the present invention.

FIG. 21 is a schematic view showing an arrangement of a solid state image sensing device according to the fourth embodiment of the present invention.

This embodiment differs from the second embodiment described above in that pixel signal processing units 300 and pixel units 400 are formed on different chips. The solid state image sensing device shown in FIG. 21 can be easily formed because only a small number of control voltage signals are required when the number of nodes of each pixel signal processing unit 300 is small.

Figure 22:
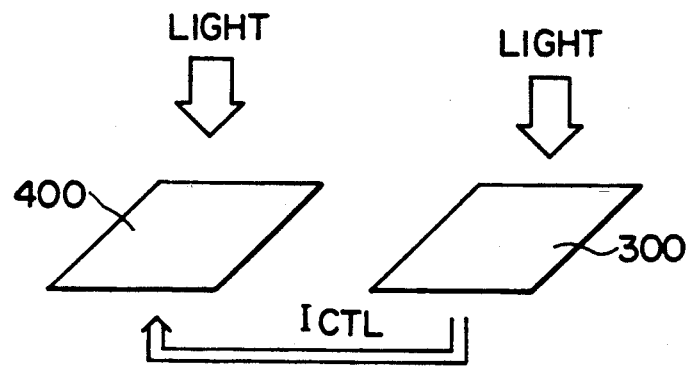
FIG. 22 is a view for explaining a method of controlling a pixel unit in the solid state image sensing device according to the fourth embodiment.

Similar to the embodiments described above, light may be radiated on both the pixel signal processing unit 300 and the pixel unit 400 using such as half mirror, as shown in FIG. 22.

Figure 23:
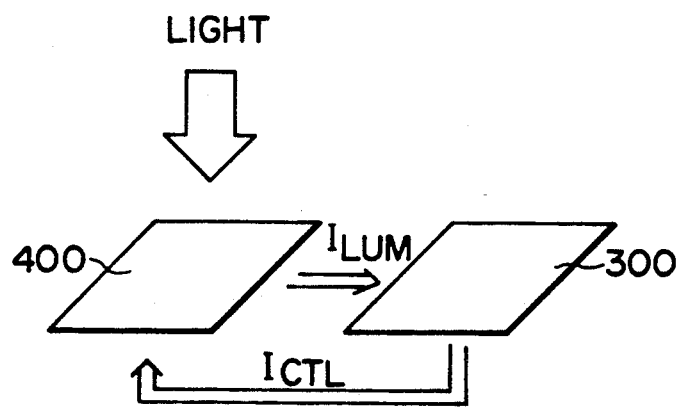
FIG. 23 is a view for explaining another method of controlling the pixel unit in the solid state image sensing device according to the fourth embodiment of the present invention.

Alternatively, as shown in FIG. 23, light may be radiated on only the pixel unit 400. In this case, a luminance signal $I_{LUM}$ obtained by the pixel unit 400 is supplied to the pixel signal processing unit 300, and a charge amount to be extracted from a photodiode of the pixel unit 400 is determined on the basis of a feedback signal $I_{CTL}$ obtained by the pixel signal processing unit 300.

In the first embodiment, 24 pixel units are controlled by one pixel signal processing unit. However, one pixel unit may be controlled by one pixel signal processing unit. In this case, diaphragm adjustment can be performed more properly.

In each of the first to fourth embodiments, the level of a control voltage is changed to have a logarithmic relationship with a light quantity when the light quantity is medium. However, the control voltage level may be changed with another relationship as long as luminance signal compression can be performed.

Embodiment 5

FIG. 24 shows a nonlinear resistor circuit as a coupling element of a camera tube device according to the fifth embodiment of the present invention. This nonlinear resistor circuit is constituted by a first MOS transistor 210, first and second resistors 220 and 230, a second MOS transistor 240, and a third MOS transistor 250. The drain and the source of the first MOS transistor 210 are connected to first and second terminals 201 and 202, respectively. The first and second resistors 220 and 230 are connected between the gate and drain and between the gate and source of the first transistor 210. The drain, the source, and the gate of the second MOS transistor 240 are connected to the drain, the gate, and the source, respectively, of the first transistor 210. The source, the drain, and the gate of the third MOS transistor 250 are connected to the source, the gate, and the drain, respectively, of the first transistor 210.

The first transistor 210 is a depletion type NMOS transistor having a negative threshold value ($V_T$). The second and third transistors 240 and 250 are enhancement type NMOS transistors having a positive threshold value ($V_{T'}$). The first and second resistors 220 and 230 are ordinary linear resistors in which a resistance does not change due to a potential difference between the two terminals, and it is assumed that their resistances are much higher than the output resistances (drain-source resistances) of the second and third transistors 240 and 250.

FIG. 25 shows a simulation result of a relationship between a voltage $V_S$ of 0 to 4 V and a current I flowing through the nonlinear resistor circuit obtained when the voltage $V_S$ is applied by a voltage source to the first terminal 201 of the nonlinear resistor circuit while a potential applied to the second terminal 202 is kept at 2 V. As is apparent from FIG. 25, the resistance nonlinearly changes due to the potential difference between the terminals 201 and 202.

Figure 26A:
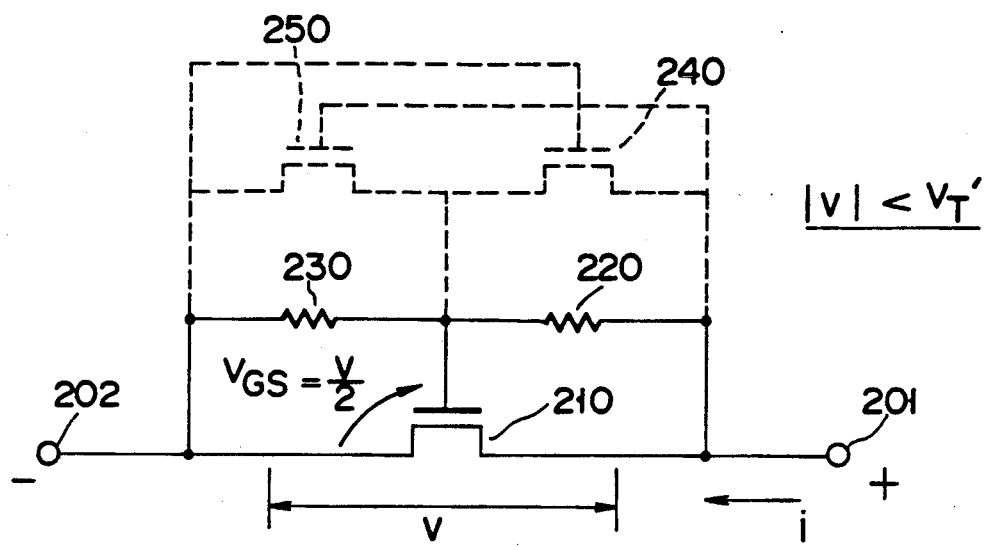
FIGS. 26A and 26B are equivalent circuit diagrams for explaining an operation of the nonlinear resistor circuit shown in FIG. 24.

The reason why the nonlinear resistor circuit has the characteristics as shown in FIG. 25 will be described in detail below. Assume that the potential difference (v) between the terminals 201 and 202 is smaller than the threshold voltage $V_{T'}$ (>0) of the second and third transistors 240 and 250, that is, $|v| < V_{T'}$. FIG. 26A shows an equivalent circuit at this time. The second and third transistors 240 and 250 are illustrated by broken lines because they are in an OFF state.

The static characteristic of the depletion type NMOS transistor used as the first transistor 210 in a nonsaturation region is given by the following equation:

$$I_d = \beta\{2(V_{GS} - V_T)V_{DS} - V_{DS}^2\} \quad (13)$$

where $I_d$ is a drain current, $V_{GS}$ is a gate-source voltage, $V_{DS}$ is a drain-source voltage, $V_T$ is a threshold voltage ($V_T < 0$), and $\beta$ is a constant independent from a bias. A condition that the transistor is in a nonsaturation region is given by:

$$V_{DS} < V_{GS} - V_T \quad (14)$$

In FIG. 26A, if the first and second resistors 220 and 230 have the same resistance, $V_{GS} = v/2$. Therefore, when $V_{GS} = v/2$ is substituted in equation (13), the following equation is obtained:

$$I_d = -2\beta V_T \cdot V \quad (15)$$

Therefore, the first transistor 210 is equivalently represented by the following resistor:

$$-\frac{1}{2\beta V_T} > 0$$

Therefore, in the state shown in FIG. 26A, the path between the terminals 201 to 202 is considered as a resistor which is a parallel synthetic resistor of the first transistor 210 and a series circuit of the first and second resistors 220 and 230 and represented by:

$$\left(-\frac{1}{2\beta V_T}\right)//2R \quad (16)$$

where R is the resistance of each of the first and second resistors 220 and 230.

The state shown in FIG. 26A is established when the second and third transistors 240 and 250 are turned off, i.e., under the following condition:

$$|v| < V_{T'} \quad (17)$$

Since equation (14) must be satisfied in order to establish equation (15), the following relation must be satisfied while $V_{DS} = V$, $V_{GS} = v/2$ is taken into consideration:

$$v < -2V_T \quad (18)$$

Therefore, if $$0 < V_{T'} \leq -2V_T \quad (19)$$

is satisfied, relation (17) is a condition under which FIG. 26A is effective.

Subsequently, when relation (19) is established, an operation of the circuit is checked under the condition of:

$$v > V_{T'} \quad (20)$$

Figure 26B:
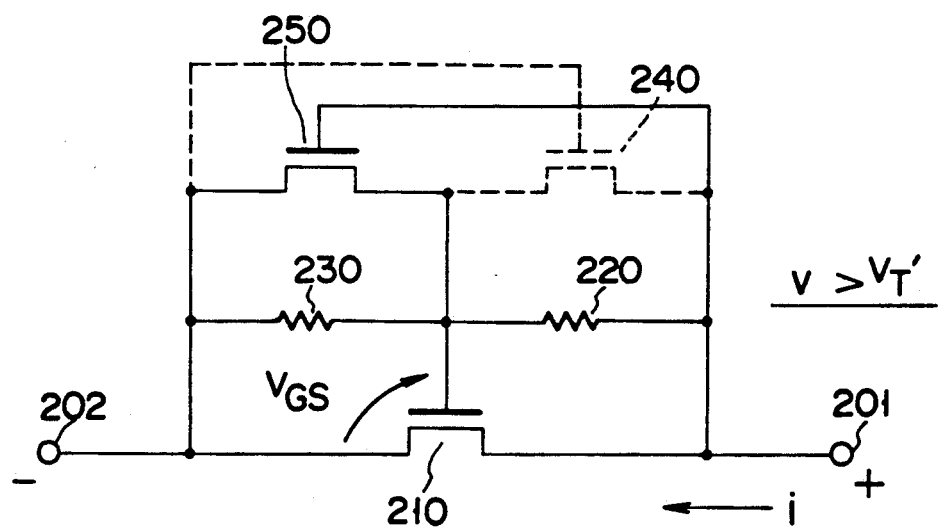

At this time, a state as shown in FIG. 26B is obtained because the third transistor 250 is turned on. Since the output resistance of the third transistor 250 is much lower than those of the first and second resistors 220 and 230 as described above, the third transistor 250 and the first resistor 220 constitute an inverter. Therefore, if the potential difference v between the terminals 201 and 202 exceeds the threshold voltage $V_{T'}$, the third transistor 250 is immediately turned on, and the gate-source voltage $V_{GS}$ of the first transistor 210 abruptly approaches 0. Since the drain current of the first transistor 210 is represented by the equation $I_d = \beta V_T^2$, and independent to voltage $V_T$, almost only R of the first resistor 220 appears as the resistance differential between the terminals 201 and 202.

As described above, in the nonlinear resistor circuit shown in FIG. 24, the resistance between the terminals 201 and 202 largely changes in accordance with the relationship between the potential difference $|v|$ between the terminals 201 and 202 and the threshold voltage $V_T'$ of the second and third transistors 240 and 250, as shown in FIG. 25. In FIG. 25, $V_T' = 1$ V.

Figure 1:
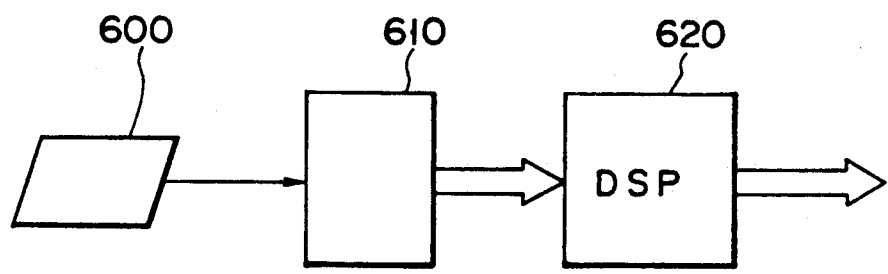
FIG. 1 is block diagrams showing a camera tube system in a conventional digital image signal processor.
Figure 2A:
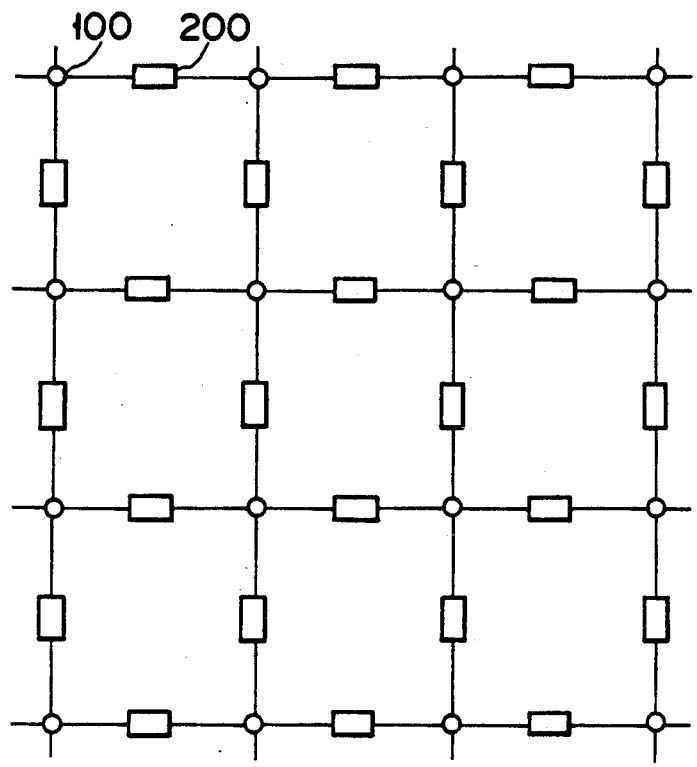
FIG. 2A is a view for explaining a linear circuit network used in a conventional analog image signal processor.
Figure 2B:
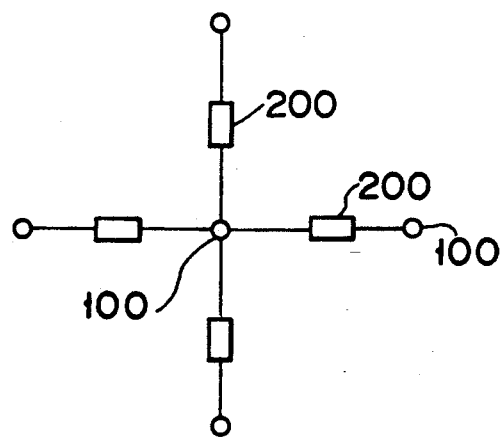
FIG. 2B is a view showing a part of the arrangement shown in FIG. 2A.
Figure 3A:
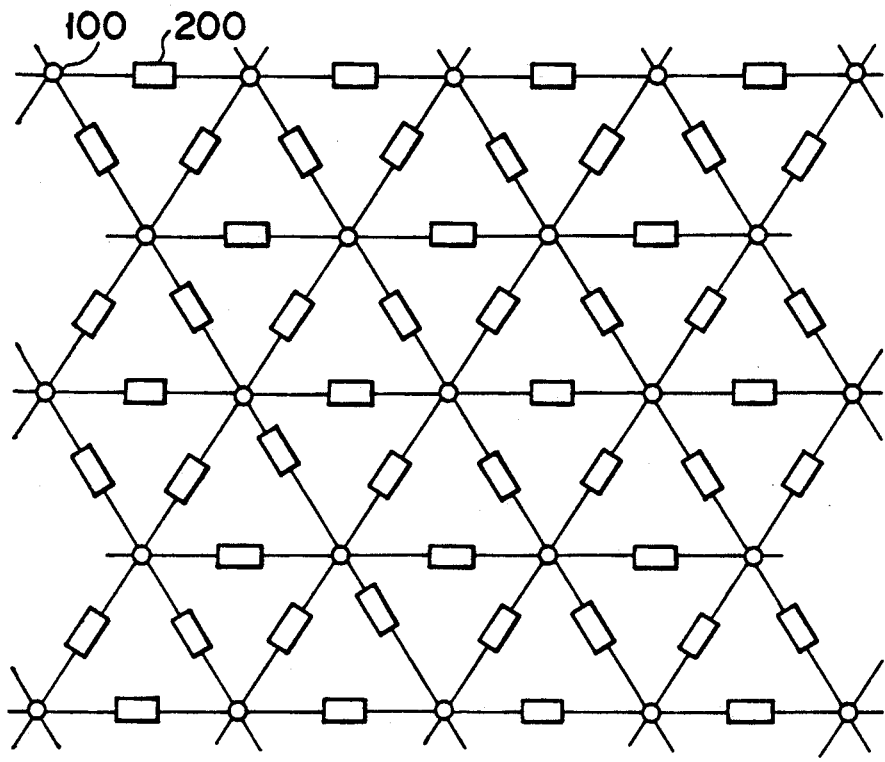
FIG. 3A is a view for explaining a linear circuit network used in a conventional analog image signal processor.
Figure 3B:
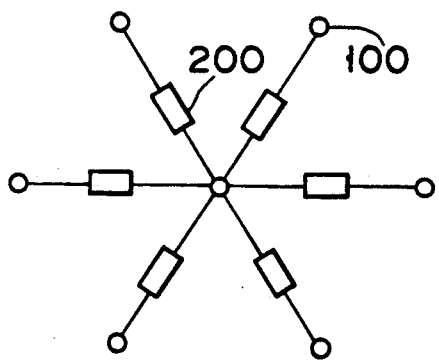
FIG. 3B is a view showing a part of the arrangement shown in FIG. 3A.
Figure 4:
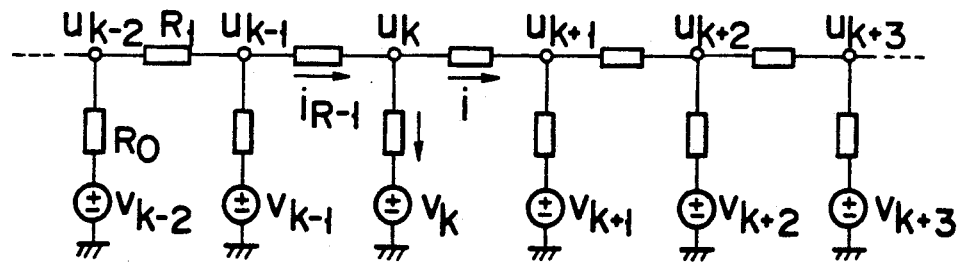
FIG. 4 is a view for explaining a linear circuit network used in a conventional analog image signal processor.
Figure 5:
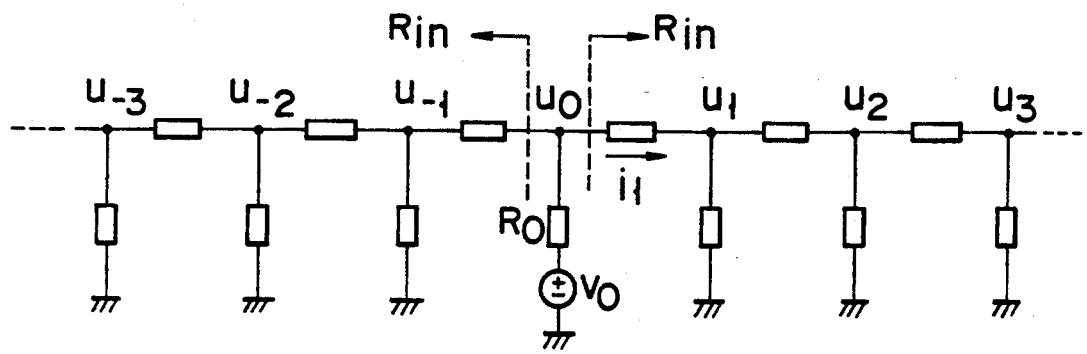
FIG. 5 is a view showing an equivalent circuit obtained when an impulse signal is input to the circuit shown in FIG. 4.
Figure 6:
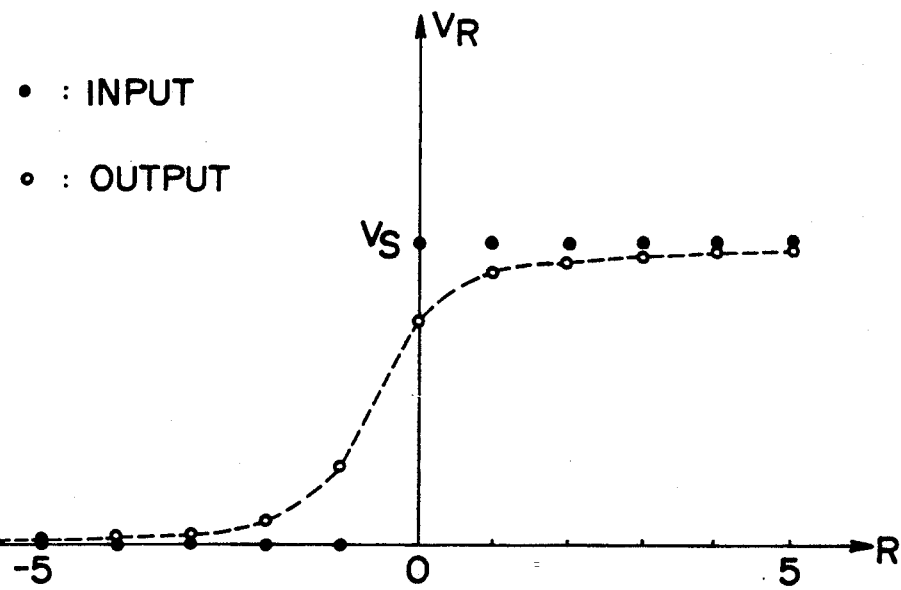
FIG. 6 is a graph showing an input/output relationship obtained when a step signal is input to the linear circuit network shown in FIG. 4.
Figure 7:
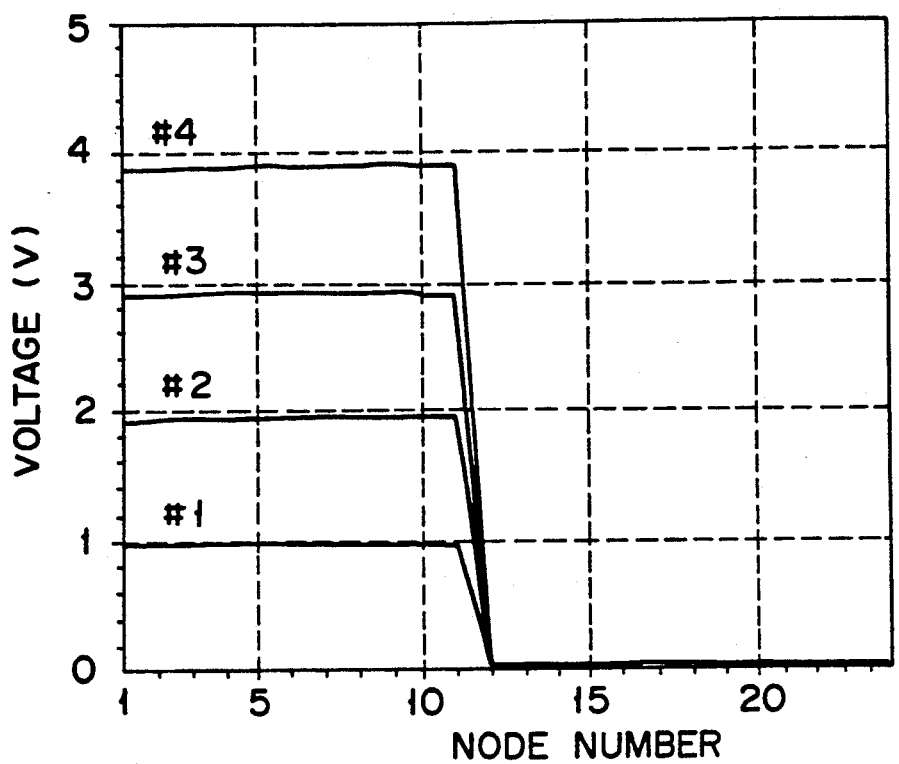
FIG. 7 is a graph showing a step input signal for explaining a step response of the linear circuit network shown in FIG. 4.
Figure 8:
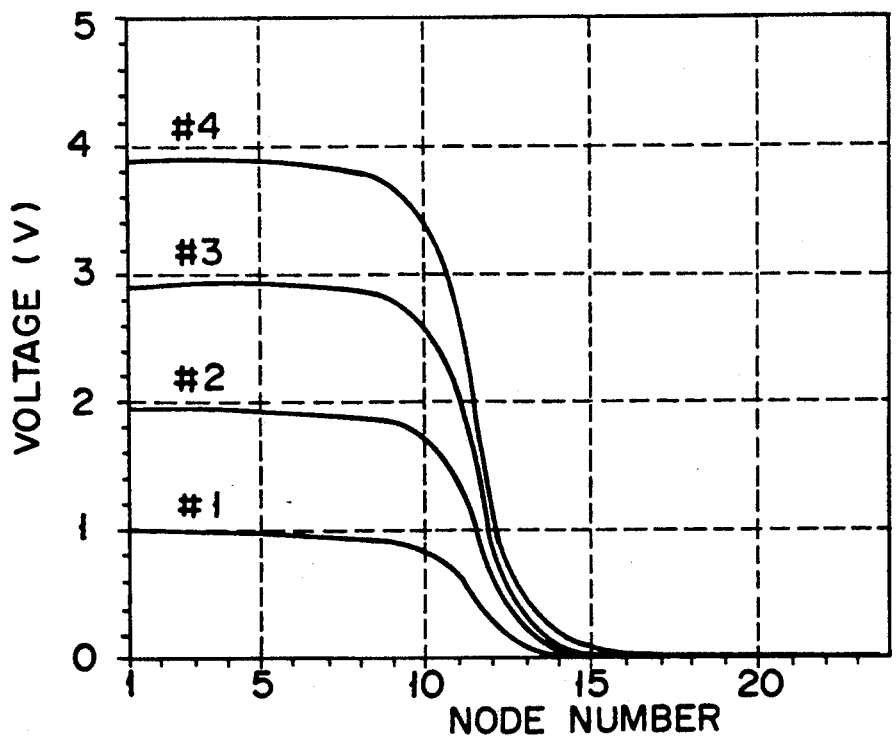
FIG. 8 is a graph showing a step response signal for explaining the step response of the linear circuit network shown in FIG. 4.
Figure 27A:
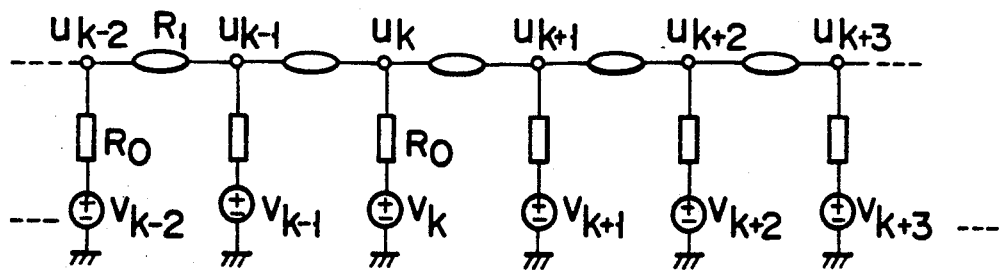
FIGS. 27A and 27B are views showing one-dimensional circuit networks each using the nonlinear resistor circuit of the present invention.
Figure 27B:
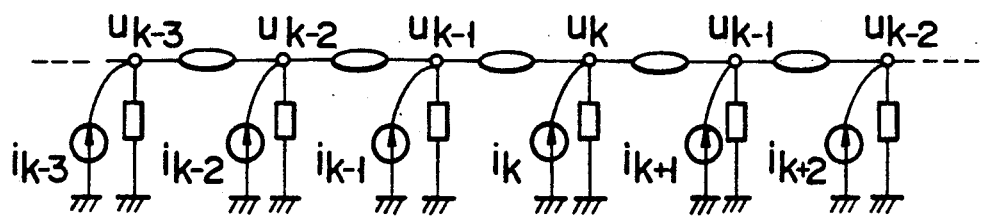
Figure 28:
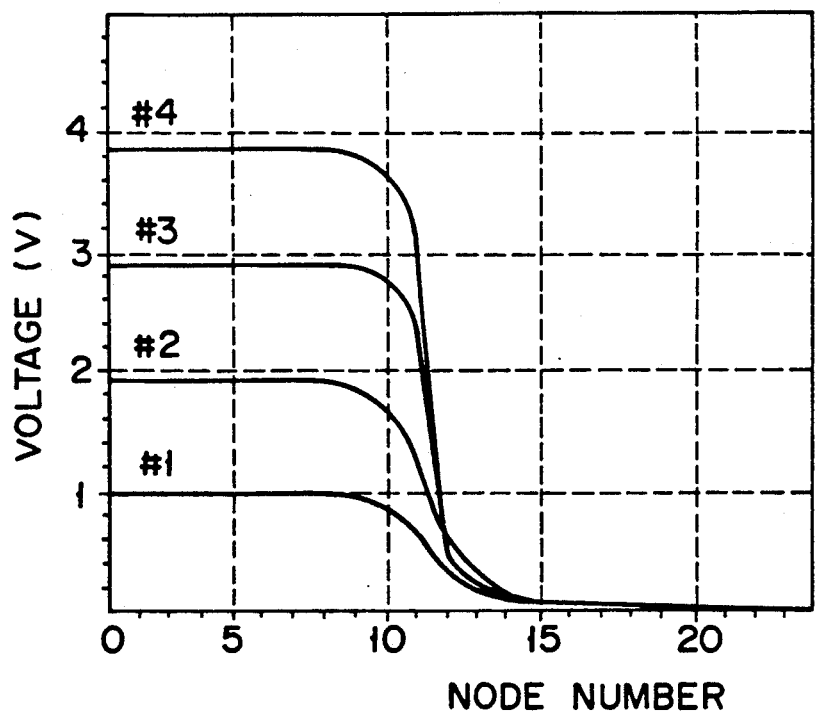
FIG. 28 is a graph showing a step response of the one-dimensional circuit networks shown in FIGS. 27A and 27B.

As shown in FIG. 27A, the nonlinear resistor circuit shown in FIG. 24 is used as a resistor $R_1$ of a coupling circuit to constitute a one-dimensional 24-node resistor circuit network. FIG. 28 shows a response obtained when a step signal shown in FIG. 7 is input to the arrangement shown in FIG. 27A. Apparently in FIG. 28, the response changes in accordance with the potential difference between steps, and coupling between the nodes is weakened from near step #2, i.e., since a potential difference between the 11th and 12th nodes becomes about 1 V. Because the coupling between the nodes is weakened, a distortion near a step considered as an edge portion is largely improved as compared with the step response shown in FIG. 8 in which the linear resistor is used as the coupling circuit. A resistor circuit network in which an input power source unit is subjected to Norton transform as shown in FIG. 27B is entirely equivalent to that shown in FIG. 27A.

FIG. 29A shows a two-dimensional lattice circuit network in which the nonlinear resistor circuits are used as coupling circuits 200 between pixel value signal processing circuits 100. FIGS. 29B and 29C show states of coupling of the pixel value signal processing circuit 100 at one node with respect to another node. FIG. 29B shows an example of a Thévenin circuit arrangement for supplying an input signal by a voltage power having a voltage v via a resistor $R_0$. FIG. 29C shows an example of a Norton circuit arrangement for supplying an input signal by a current source having a current $v/R_0$ and a resistor $R_0$. Also in the circuit network shown in FIG. 29A, since coupling is weakened near an edge as in the case shown in FIG. 27, a distortion in a node value near the edge can be decreased.

Figure 30A:
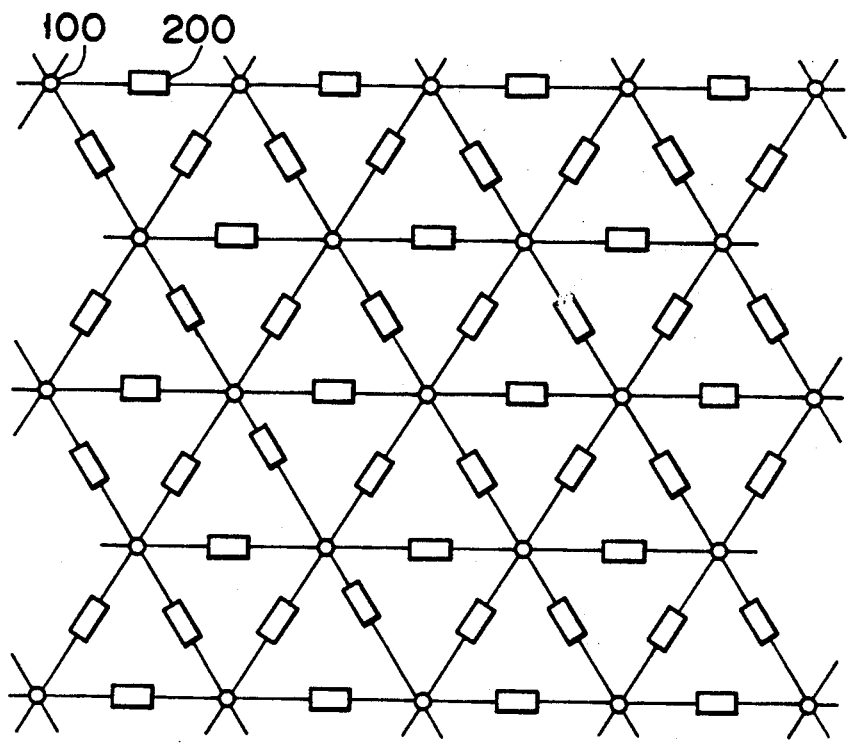
FIGS. 30A to 30C are views for explaining a two-dimensional circuit network of a triangular form using the nonlinear resistor circuit of the present invention.
Figures 30B, 30C:
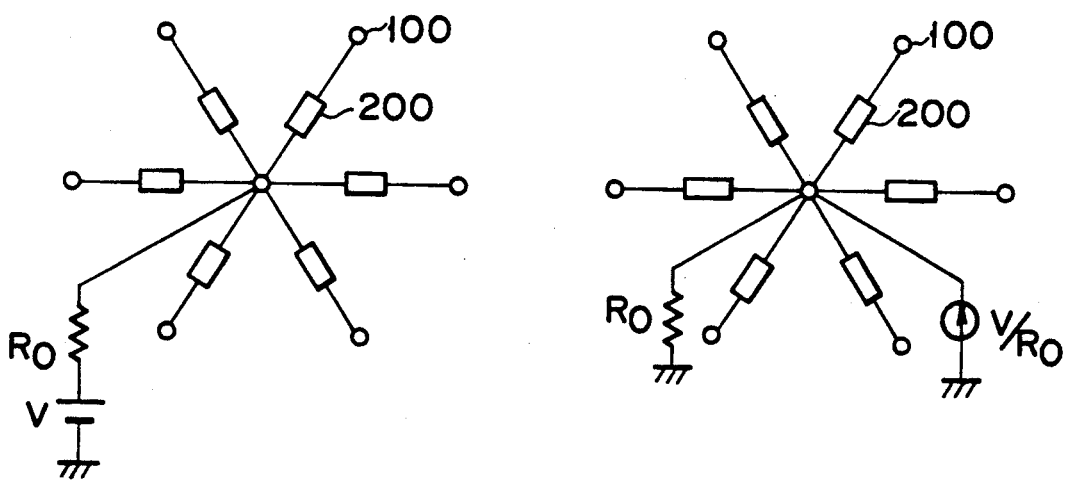

FIG. 30A shows a two-dimensional circuit network of a triangular form in which the nonlinear resistor circuits are used as coupling circuits 200 between pixel value signal processing circuits 100. FIGS. 30B and 30C show states of coupling of the pixel value signal processing circuit 100 at one node with respect to another node. FIG. 30B shows an example of a Thévenin circuit arrangement for supplying an input signal by a voltage source having a voltage v via a resistor $R_0$, and FIG. 30C shows an example of a Norton circuit arrangement for supplying an input signal by a current source having a current $v/R_0$ and a resistor $R_0$. Also in the circuit network shown in FIG. 30A, since coupling is weakened near an edge as in the circuit network shown in FIG. 28, a distortion in a node value near the edge can be decreased.

Embodiment 6

FIG. 31 shows a nonlinear resistor circuit as a coupling element of a image sensing device according to the sixth embodiment of the present invention. In this embodiment, resistor circuits 222 and 232 consisting of complementary MOS transistors are used in place of the first and second resistors 220 and 230 in FIG. 24. The resistor circuits 222 and 232 using the complementary MOS transistors have a small distortion throughout a comparatively wide range. A basic operation of the nonlinear resistor circuit shown in FIG. 31 is similar to that of the arrangement shown in FIG. 24, and functions of the circuit networks shown in FIGS. 27, 29 and 30 using the nonlinear resistor circuit of this embodiment are similar to those of the networks using the nonlinear resistor circuit shown in FIG. 24. The number of elements of the arrangement according to this embodiment using CMOS transistors is smaller than those of the circuits described in the known references cited in "Description of the Related Art".

Embodiment 7

FIG. 32 shows a nonlinear resistor circuit as a coupling element of a image sensing device according to the seventh embodiment of the present invention. In this embodiment, resistor circuits 224 and 234 constituted by NMOS transistors are used in place of the first and second resistors 220 and 230 shown in FIG. 24. FIG. 33 shows a resistor circuit constituted by an NMOS transistor. In this embodiment, NMOS transistors 225A and 225B are of a depletion type and the same in size. A threshold value $V_T''$ of the transistors 225A and 225B is given by:

$$V_T'' < 0$$

An equation of static characteristics of the transistor 225A is written as follows from equation (13):

$$i_1 = \beta'.(-v^2 - 2V_T''.v)$$

and that of the transistor 225B is given by:

$$i_2 = \beta'.(-2V_T''.v + v^2)$$

To establish the above equations, the following relation must be satisfied from relation (14):

$$v < -V_T''$$

A current flowing through the resistor circuit shown in FIG. 33 is given by:

$$i = i_1 + i_2 = -4\beta'.V_T'.v$$

Therefore, the resistor circuit shown in FIG. 33 is equivalent to a resistor having a resistance of $1/(-4\beta'.V_T'')$.

A basic operation of the nonlinear resistor circuit shown in FIG. 32 is similar to those of the nonlinear resistor circuits shown in FIGS. 24 and 31, and functions of the circuit networks shown in FIGS. 27, 29 and 30 using the nonlinear resistor circuit of this embodiment are similar to those using the nonlinear resistor circuits shown in FIGS. 24 and 31.

Embodiment 8

FIG. 34 shows a nonlinear resistor circuit as a coupling element of a image sensing device according to the eighth embodiment of the present invention. In this embodiment, a threshold value at which a resistance between terminals 201 and 202 is nonlinearly switched is variable. Referring to FIG. 34, transistors 262 and 264, and transistors 272 and 274 constitute level shift circuits 260 and 270, respectively. The input terminal of the first level shift circuit 260 is connected to the source of a first transistor 210, and its output terminal is connected to the gate of a second transistor 240. The input terminal of the second level shift circuit 270 is connected to the drain of the first transistor 210, and its output terminal is connected to the gate of a third transistor 250. The gates of the transistors 264 and 247 are applied with a reference voltage $V_R$.

Assuming that the transistors 262 and 272, and the transistors 264 and 274 have the same characteristics, respectively, a level shift amount of each of the level shift circuits 260 and 270 is equal to the reference voltage $V_R$. Therefore, the gate potential of each of the second and third transistors 240 and 250 becomes lower than that shown in FIG. 24 by $V_R$.

FIG. 35 shows static characteristics of the nonlinear resistor circuit shown in FIG. 34. As shown in FIG. 35, a threshold value $\Delta v_0$ at which the resistance between the terminals 201 and 202 is switched becomes larger than the threshold value $\Delta v_0$ of the nonlinear circuit shown in FIG. 24 by $V_R$. That is, this threshold value is given by:

$$\Delta v_0 = V_T' + V_R \qquad (21)$$

where $V_T'$ is the threshold voltage of the second and third transistors 240 and 250 as described above. Therefore, $\Delta v_0$ can be changed as indicated by an alternate long and dashed line in FIG. 35 by the variable reference voltage $V_R$.

According to this embodiment, the threshold value at which the resistance between the terminals 201 and 202 can be varied. Therefore, an extraction level of an edge can be optimally set by varying the threshold value in accordance with the level of noise or the like.

In addition, in this embodiment, the threshold voltage of the second and third transistors 240 and 250 is equivalently $\Delta v_0$. Therefore, all of the first, second, and third transistors 210, 240, and 250 and the transistors 262 to 274 can be formed by depletion type MOS transistors, resulting in a large advantage in the formation of transistors.

Embodiment 9

Each of the above fifth to eighth embodiments shows a nonlinear resistor circuit in which a resistance is increased when a voltage applied across two terminals of the circuit is a predetermined threshold value or more and decreased when it is the threshold value or less. To contrary to the fifth to eighth embodiments, a nonlinear resistor circuit in which a resistance is decreased when a voltage is a threshold value or more and increased when it is the threshold value or less can be formed by using PMOS transistors.

FIG. 36 shows a nonlinear resistor circuit as a coupling element of a image sensing device according to the ninth embodiment of the present invention. In this embodiment, the second and third transistors 240 and 250 in the first embodiment shown in FIG. 24 are replaced by enhancement type PMOS transistors 245 and 255. Although an operation of the nonlinear resistor circuit of this embodiment is basically the same as that of the first embodiment, since the transistors 245 and 255 are of a p-type, the gate bias state of a first transistor 210 is opposite to that in the first embodiment. That is, when a voltage v applied across terminals 201 and 202 exceeds a threshold voltage of the transistors 245 and 255, the gate bias of the first transistor 210 is increased to decrease the resistance of the nonlinear resistor circuit. When the voltage v is the threshold voltage of the transistors 245 and 255 or less, the resistance of the nonlinear resistor circuit is increased.

When the nonlinear resistor circuit as shown in FIG. 36 is used as a coupling circuit in the circuit networks as shown in FIGS. 27, 29 and 30, coupling in the circuit network is weakened where a difference between adjacent pixel values is small and strengthened where it is large, contrary to the cases using the nonlinear resistor circuits of the fifth to eighth embodiments. That is, a small difference (including noise) is not smoothed but remains unchanged, and smoothing is effective where a difference is large. Therefore, an effect of removing or weakening a high contrast portion of an image can be obtained.

The present invention is not limited to the above embodiments but can be variously modified and carried out without departing from the spirit and scope of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A solid state image sensing device comprising:
    signal charge storage elements, arranged in a matrix on a semiconductor substrate, for storing a signal charge generated by photoelectric conversion;
    signal charge reading elements provided adjacent each of said signal charge storage elements for reading out the signal charge from said signal charge storage elements;
    a pixel signal processing unit, provided in each of a plurality of blocks obtained by dividing the matrix of said signal charge storage elements, for detecting a luminance of a light incident thereto to output a control signal corresponding to the luminance; and
    signal charge extracting elements provided adjacent to each of said signal charge storage elements and controlled by the control signal obtained by said pixel signal processing unit in relation to a corresponding one of said blocks to discard an excessive part and extract a remaining part from the corresponding signal charge of said signal charge storage elements.

2. A device according to claim 1, comprising plural pixel signal processing units, wherein adjacent ones of said pixel signal processing units are connected via a coupling element.

3. A device according to claim 1, wherein said signal charge storage elements, said signal charge reading elements, and said signal charge extracting elements constitute integrally formed pixel elements.

4. A device according to claim 3, wherein said pixel signal processing unit and said pixel elements are formed in different wells.

5. A device according to claim 3, wherein said pixel signal processing unit and said pixel elements are formed on different chips.

6. A solid state image sensing device comprising:
    signal charge storage elements, arranged in a matrix on a semiconductor substrate, for storing a signal charge generated by photoelectric conversion;
    signal charge reading elements provided adjacent each of said signal charge storage elements for reading out the signal charge from said signal charge storage elements;

pixel signal processing units, provided in respective of a plurality of blocks obtained by dividing the matrix of said signal charge storage elements, for detecting a luminance of a light incident thereto to output a control signal corresponding to the luminance;

signal charge extracting elements provided adjacent to each of said signal charge storage elements and controlled by the control signal obtained by said pixel signal processing units in relation to a corresponding one of said blocks to discard an excessive part and extract a remaining part from the corresponding signal charge of said signal charge storage elements; and coupling elements for connecting adjacent pixel signal processing units.

7. A device according to claim 6 wherein said coupling element is constituted by a nonlinear resistor circuit.

8. A device according to claim 7, wherein said nonlinear resistor circuit includes:
 a first MOS transistor having a drain connected to a first terminal and a source connected to a second terminal;
 a first resistor element connected between the gate and drain of said first MOS transistor;
 a second resistor element connected between the gate and source of said first MOS transistor;
 a second MOS transistor having a drain connected to the drain of said first MOS transistor, a source connected to the gate of said first MOS transistor, and a gate connected to the source of said first MOS transistor;
 a third MOS transistor having a source connected to the source of said first MOS transistor, a drain connected to the gate of said first MOS transistor, and a gate connected to the drain of said first MOS transistor;
 a first level shift circuit having an input terminal connected to the source of said first MOS transistor and an output terminal connected to the gate of said second MOS transistor; and
 a second level shift circuit having an input terminal connected to the drain of said first MOS transistor and an output terminal connected to the gate of said third MOS transistor.

9. A device according to claim 8, wherein said first and second resistor elements are constituted by resistor circuits consisting of complementary MOS transistors.

10. A device according to claim 8, wherein said first and second resistor elements are constituted by resistor circuits consisting of complementary NMOS transistors.

11. A device according to claim 8, wherein said second and third MOS transistors are enhancement PMOS transistors.

12. A device according to claim 7, wherein said nonlinear resistor circuit includes:
 a first MOS transistor having a drain connected to a first terminal and a source connected to a second terminal;
 a first resistor element connected between the gate and drain of said first MOS transistor;
 a second resistor element connected between the gate and source of said first MOS transistor;
 a second MOS transistor having a drain connected to the drain of said first MOS transistor, a source connected to the gate of said first MOS transistor, and a gate connected to the source of said first MOS transistor; and
 a third MOS transistor having a source connected to the source of said first MOS transistor, a drain connected to the gate of said first MOS transistor, and a gate connected to the drain of said first MOS transistor.

13. A device according to claim 12, wherein said first and second resistor elements are constituted by resistor circuits consisting of complementary MOS transistors.

14. A device according to claim 12, wherein said first and second resistor elements are constituted by resistor circuits consisting of complementary NMOS transistors.

15. A device according to claim 12, wherein said second and third MOS transistors are enhancement PMOS transistors.

* * * * *